United States Patent [19]

Tateyama et al.

[11] Patent Number: 5,852,511
[45] Date of Patent: Dec. 22, 1998

[54] OPTICAL SYSTEM FOR NON-FLEXIBLE ENDOSCOPES

[75] Inventors: Noriyuki Tateyama; Tsutomu Igarashi, both of Hachioji, Japan

[73] Assignee: Olympus Optical Co. Ltd, Tokyo, Japan

[21] Appl. No.: 718,163

[22] Filed: Sep. 19, 1996

Related U.S. Application Data

[62] Division of Ser. No. 282,453, Jul. 29, 1994, abandoned.

[30] Foreign Application Priority Data

| Oct. 20, 1993 | [JP] | Japan | 5-284146 |
| Nov. 8, 1993 | [JP] | Japan | 5-300803 |

[51] Int. Cl.$^6$ ............ G02B 21/36; G02B 27/02; G02B 3/02; G02B 9/12

[52] U.S. Cl. ............ 359/362; 359/363; 359/434; 359/716; 359/717; 359/792; 359/644; 359/690; 359/367

[58] Field of Search .................. 359/362, 644, 359/690, 689, 660, 356, 359, 663, 792, 708, 363, 367, 432, 434, 716, 717; 348/65, 69, 70, 71, 72, 73, 75

[56] References Cited

U.S. PATENT DOCUMENTS

| 4,036,218 | 7/1977 | Yamashita et al. | 359/435 |
| 4,575,195 | 3/1986 | Hoogland | 359/716 |
| 4,641,927 | 2/1987 | Prescott et al. | 359/654 |
| 5,177,605 | 1/1993 | Takahashi et al. | 348/65 |
| 5,206,759 | 4/1993 | Ono et al. | 359/434 |
| 5,396,366 | 3/1995 | Brown et al. | 359/435 |
| 5,412,504 | 5/1995 | Leiner et al. | 359/434 |

FOREIGN PATENT DOCUMENTS

| 219522 | 12/1983 | Japan | 359/792 |
| 147223 | 7/1986 | Japan | 359/716 |
| 2-503361 | 10/1990 | Japan . | |
| 2-272512 | 11/1990 | Japan . | |
| 4-93909 | 3/1992 | Japan . | |
| 406258574 | 9/1994 | Japan | 359/717 |

OTHER PUBLICATIONS

WO 93/15647, Aug. 19, 1993, PCT/US93/00515, Filed Jan. 28, 1993.

Primary Examiner—Davis L. Willis
Assistant Examiner—Mohammad Y. Sikder
Attorney, Agent, or Firm—Pillsbury Madison & Sutro LLP

[57] ABSTRACT

In a non-flexible endoscope consisting of an insertion section and an eyepiece section which are separable from each other, an optical system configured so as to correct chromatic aberration produced by an observation optical system disposed in the insertion section with an eyepiece optical system disposed in the eyepiece section. The optical system according to the present invention selects a simple composition for the observation optical system so that it is manufacturable at a low cost and disposable, and is configured so as to have favorable optical performance as a whole by correcting chromatic aberration produced by the observation optical system with the eyepiece optical system.

12 Claims, 10 Drawing Sheets

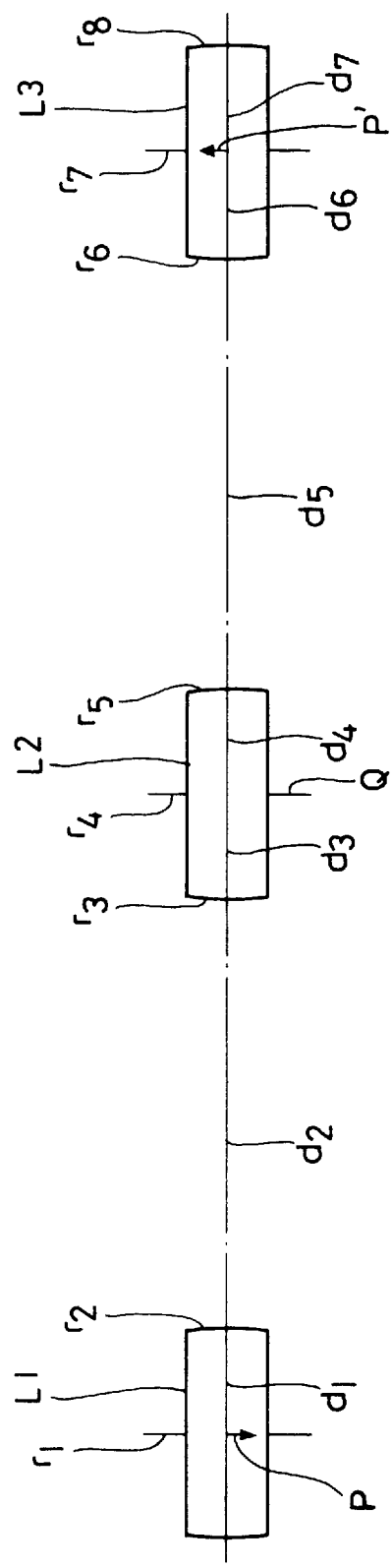
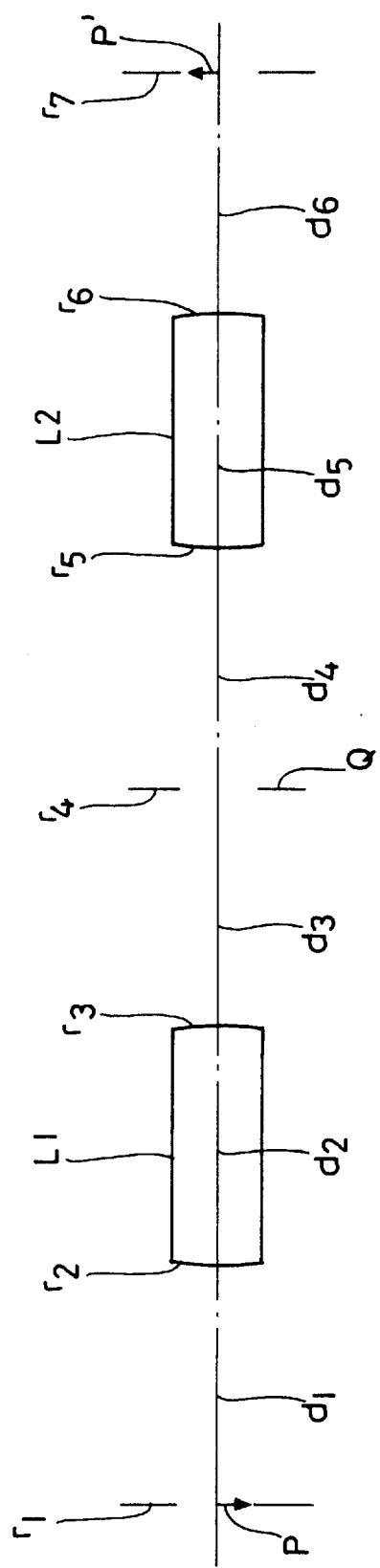

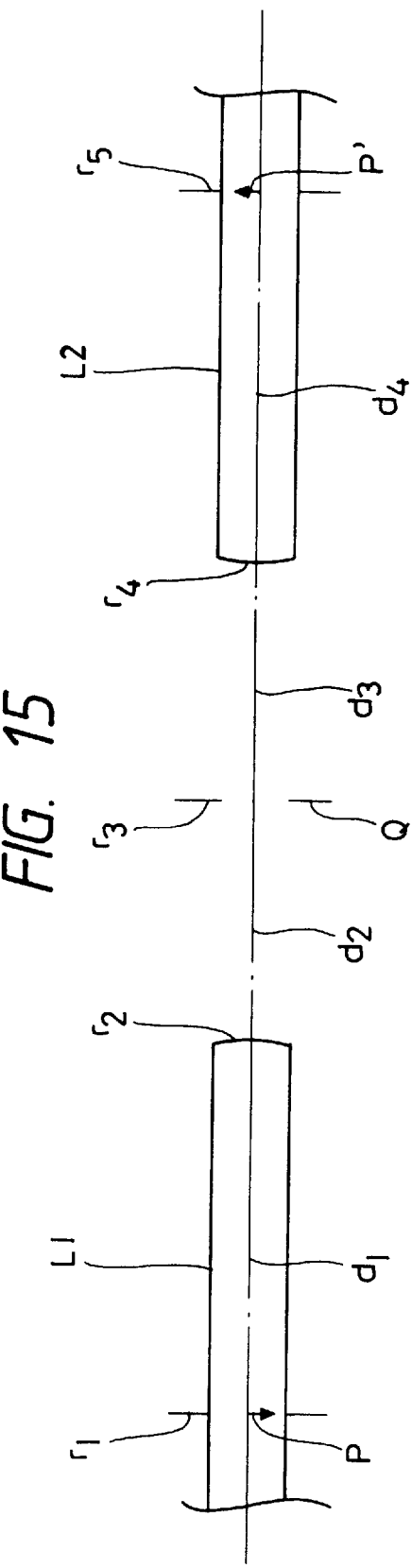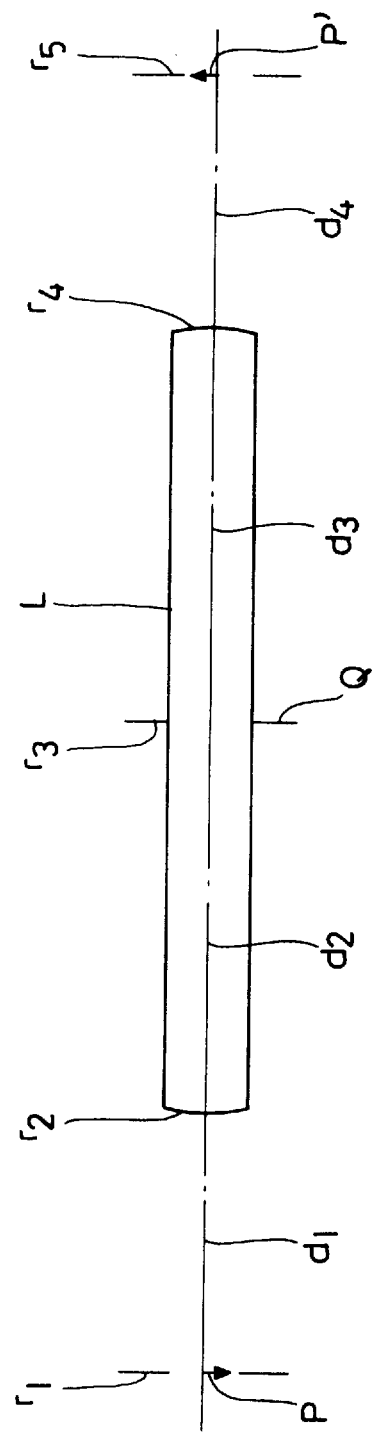

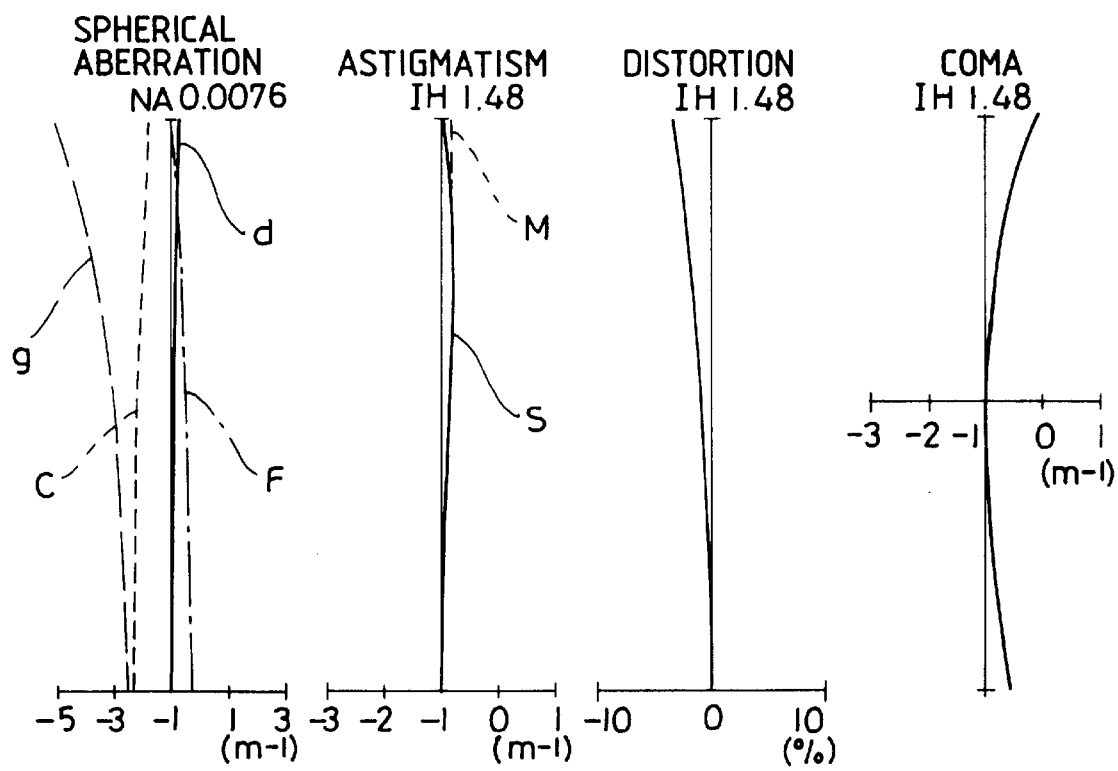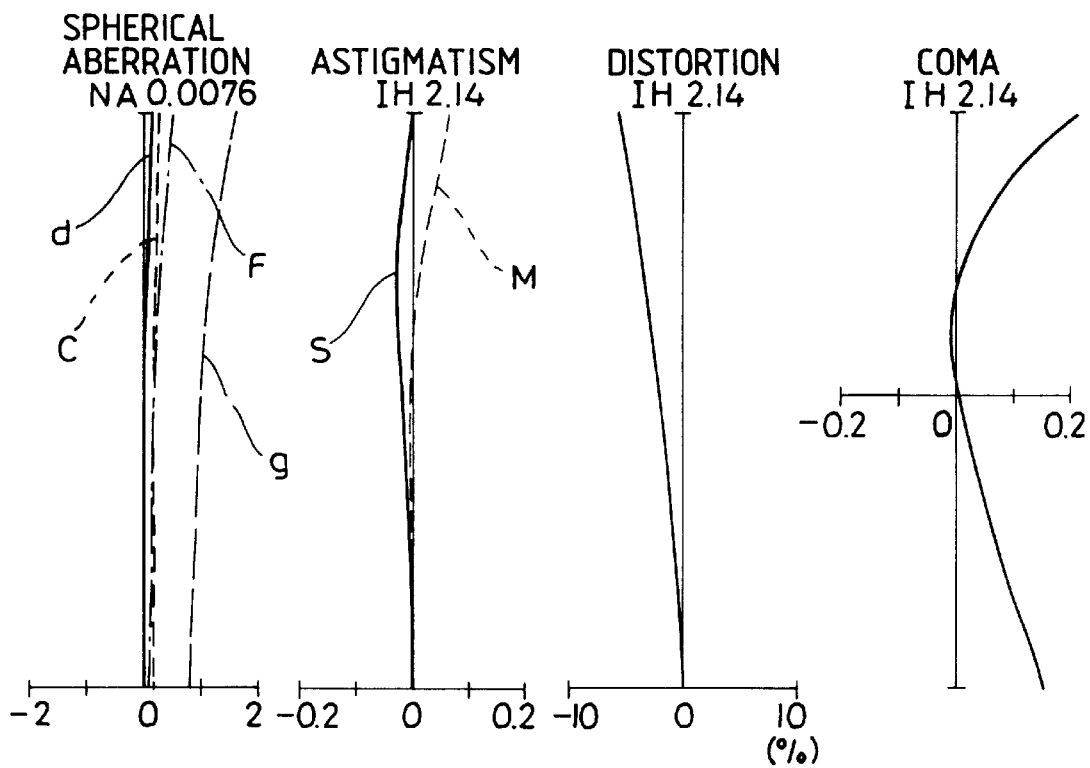

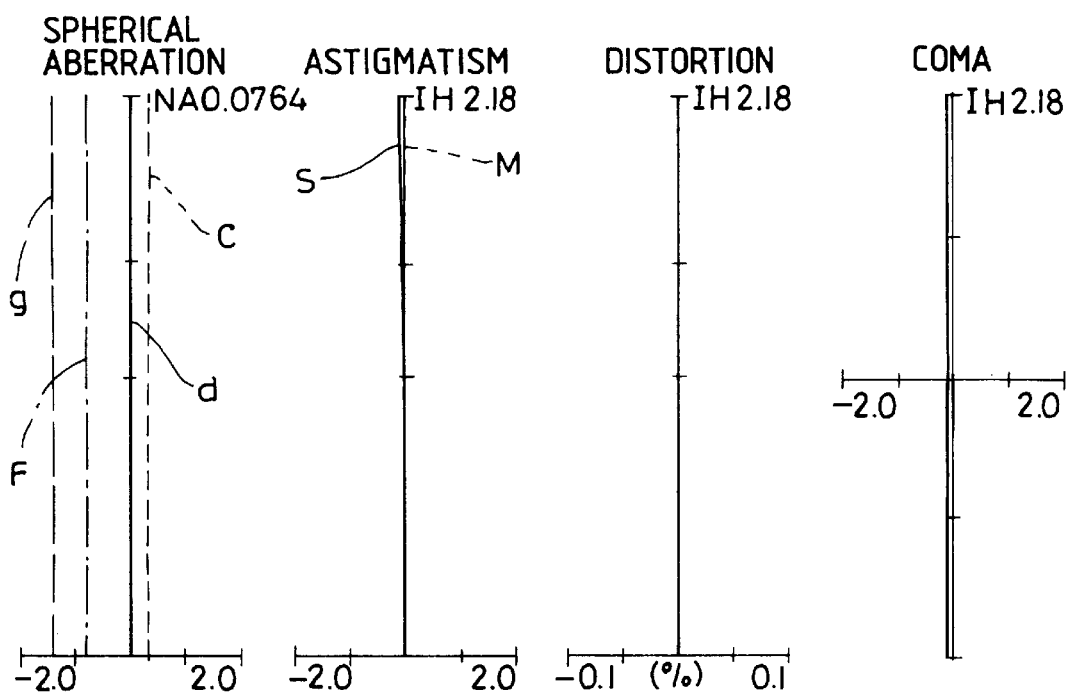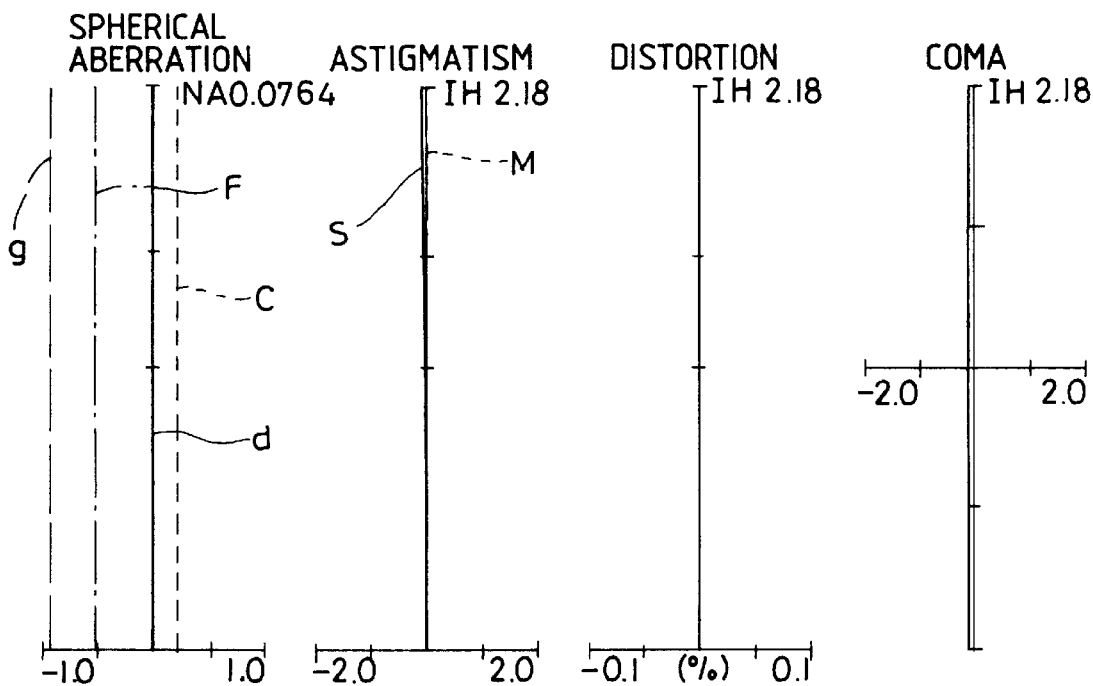

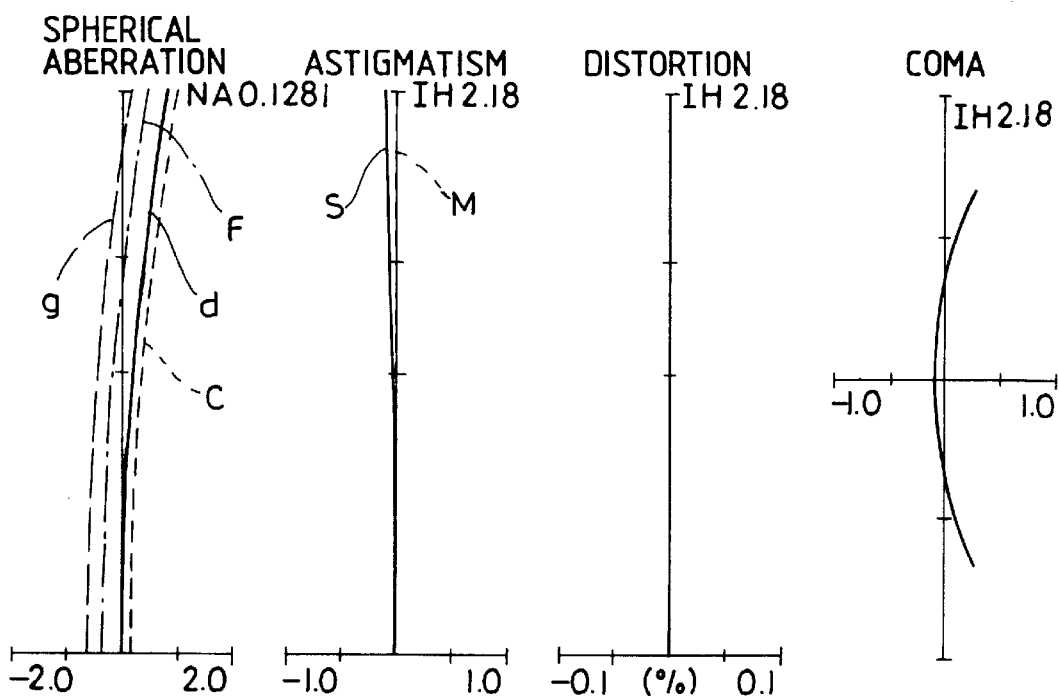
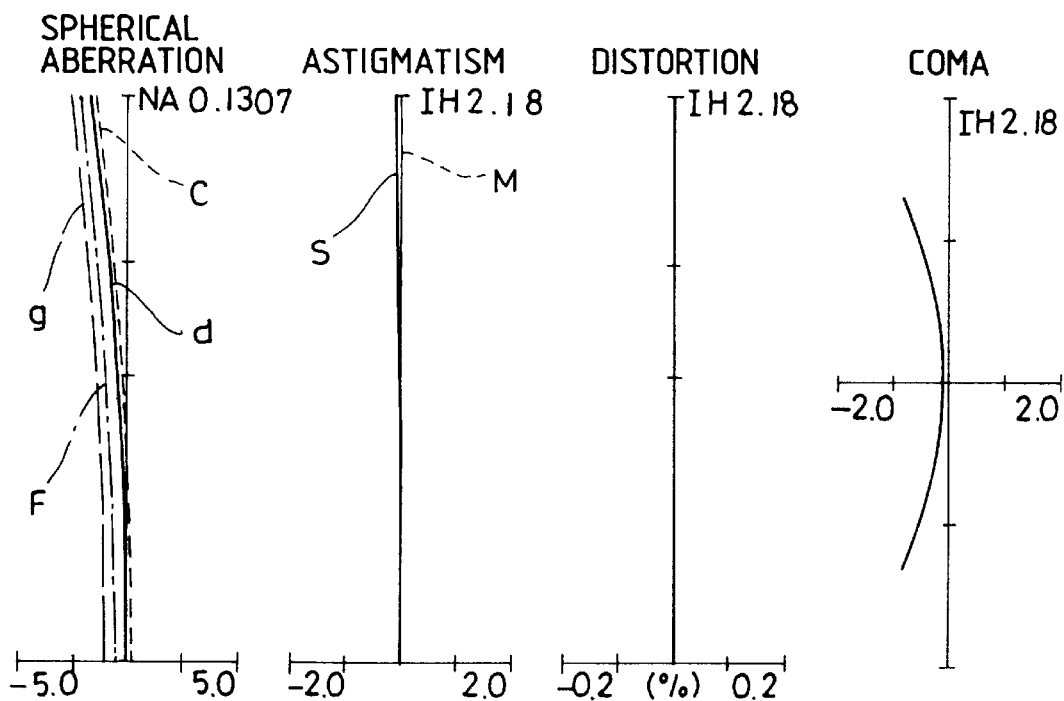

OPTICAL SYSTEM FOR NON-FLEXIBLE ENDOSCOPES

This is a division of application Ser. No. 08/282,453, filed on Jul. 29, 1994, now abandoned.

BACKGROUND OF THE INVENTION a) Field of the Invention

The present invention relates to an optical system to be used for non-flexible endoscopes which are used widely in the medical field, and more specifically an optical system to be used for disposable non-flexible endoscopes.

b) Description of the Prior Art

In the surgical field of the recent medicine, surgical operations in minimum contact conditions with higher parasites are prevailing by using endoscopes and treating tools prepared exclusively therefor. Medical treatments of diseases which conventionally required laparotomy can now be carried out in the minimum contact conditions with the higher parasites while observing affected parts through endoscopes so as to lessen burdens in social lives of patients by shortening periods of time for hospital treatments. The surgical operations under observation through endoscopes are expected to be further developed in the future.

Dependently on structures of sections which are to be inserted into human body cavities (hereinafter to be referred to as "insertion sections") endoscopes are classified into two types: flexible endoscopes and non-flexible endoscopes. Out of these two types, the non-flexible endoscopes which form images of higher qualities are used for surgical operations under observations through endoscopes. Further, the non-flexible endoscopes feature another merit that they can be sterilized with steam (or by autoclaving). Under the recent circumstances where serious problems are posed by hospital infections, those who are engaged in medical treatments are highly sensible of sterilization of medical instruments and tools. Since appliances for sterilization are used more widely in practice than other types of appliances for sterilization, resistance to the sterilization with steam is demanded also for endoscopes. For the non-flexible endoscopes which comprise no flexible section, it is easy to select materials and structures which are bearable of the sterilization with steam.

On the other hand, attempts are being made to configure non-flexible endoscopes so as to be disposable as a measure for preventing hospital infections. An important problem for realizing disposable non-flexible endoscopes lies in reduction of manufacturing costs while maintaining optical performance thereof required for practical use.

FIG. 1 shows a sectional view illustrating a conventional optical system for non-flexible endoscopes. As seen in this drawing, the conventional optical system for non-flexible endoscopes consists of an objective optical system O, a relay optical system R and eyepiece optical system E which are integrated with one another in a main body. The conventional optical system for non-flexible endoscopes comprises a plurality of cemented lens components which have important roles for correcting aberrations. Accordingly, the conventional optical system for non-flexible endoscopes uses a large number of parts and requires a large number of assembling steps including those for cementing lens elements, whereby the optical system cannot be manufactured at a cost low enough for making the optical system disposable even when the lens components are made of plastic materials.

Further, Japanese Patent Kokai Publication No. Hei 2-503,361 discloses a disposable optical system which is to be used with non-flexible endoscopes. This optical system for non-flexible endoscopes uses plastic lens components in an objective optical system, a relay optical system and an inspection (eyepiece) optical system thereof for lowering manufacturing cost and enhancing mass productivity thereof. In addition, this optical system for non-flexible endoscopes uses no cemented lens component for correcting longitudinal chromatic aberration so that the optical system can be assembled in simple procedures by using a small number of parts. As a result, this optical system for non-flexible endoscopes can hardly form images with qualities high enough for practical use.

A reason for the defect of this optical system for non-flexible endoscopes will be described below on the basis of a simple calculation example. First, description will be made of chromatic aberration to be produced by the relay optical system. A refractive power distribution in the relay optical system is visualized in FIG. 2, wherein the reference symbol R represents the relay optical system, the reference symbols $O_d$ and $O_F$ designate object points for the d-line and the F-line respectively, and the reference symbols $I_d$ and $I_F$ denote imaging points for the d-line and the F-line respectively. Though positive refractive powers are actually distributed in the vicinities of $O_d$ and $I_d$ for transmitting a pupil, these powers substantially have no influences on longitudinal chromatic aberration and will be ignored. A positive refractive power is distributed in the middle of this drawing for transmitting an image at a magnification of 1×. In this optical system, the positive refractive power distributed in the middle section thereof deviates the image points dependently on wavelengths and the deviations on the image points directly appear as longitudinal chromatic aberration. Considering chromatic aberration to be produced by the d-line (having a wavelength of 587.56 nm) and the F-line (having a wavelength of 486.13 nm), longitudinal chromatic aberration ΔF to be produced per unit relay lens system is expressed as follows:

$$\Delta F = 4(f_F - f_d) \quad (a)$$

wherein the reference symbol $f_F$ represents a focal length of the unit relay lens system for the F-line and the reference symbol $f_d$ designates a focal length of the unit relay lens system for the d-line.

Further, $f_F$ and $f_d$ are in the following relationship:

$$f_d(n_d - 1) = f_F(n_F - 1) \quad (b)$$

wherein the reference symbols $n_d$ and $n_F$ represent refractive indices of the unit relay lens system for the d-line and the F-line respectively.

By eliminating $f_F$ from the formulae (a) and (b), and adequately arranging these formulae, we obtain the following formula (c):

$$\Delta F = 4 f_d [(n_d - n_F)/(n_F - 1)] \quad (c)$$

Let us assume that the unit relay lens system is 100 mm long, $f_d$ is 25 mm and the unit relay lens system is composed of lens component made of a plastic material. Then, $n_d$ is 1.492 and $n_F$ is 1.498, whereby the formula (c) gives ΔF=−1.20 mm. Since a non-flexible endoscope ordinarily has an insertion section at least 300 mm long, three relay cycles allows F-line to produce longitudinal chromatic aberration of 3 ΔF=−3.60 mm.

When an eyepiece optical system having an observation magnification of 10× (a focal length of 25 mm) is combined with the relay optical system configured to perform three relay cycles, conversion of longitudinal chromatic aberration into diopter indicates that longitudinal chromatic aberration of −3.60 mm produced by the relay optical system corresponds to a diopter deviation of $-3.60/(-25^2/1000)= 5.76[m^{-1}]$.

As is understood from the foregoing description, when the d-line has diopter of $-1\ m^{-1}$ for observation by human eyes, for example, the F-line has diopter of $4.76\ m^{-1}$ for observation by human eyes, whereby an image formed by the F-line is badly blurred on the retina of human eyes. The retina of human eyes is ordinarily capable of adjusting observing diopter within a range from $-4\ m^{-1}$ to $0\ m^{-1}$ or has an adjustable span of $\pm 2\ m^{-1}$. The above-mentioned diopter deviation of $5.76\ m^{-1}$ is far larger than the adjustable span of $\pm 2\ m^{-1}$. Taking into consideration longitudinal chromatic aberration to be produced by rays other than the F-line which are included in the visible rays having wavelengths within a range from 400 nm to 700 nm, an optical system such as the above-mentioned example which produces longitudinal chromatic aberration is incapable of an image of an object having a broad range of colors.

Then, an ordinary non-flexible endoscope uses a relay optical system R which is composed of a plurality of unit relay lens systems, for example, three unit relay lens systems $R_1$, $R_2$ and $R_3$, as illustrated in FIG. 3, for consecutively reproducing an image P formed by an objective optical system O as images $P_1$, $P_2$, . . . for forming a final image$P_L$ which is to be observed through an eyepiece optical system E.

As a relay optical system of this type, there is known the optical system disclosed by Japanese Patent Kokai Publication No. Hei 2-272,512. This relay optical system uses a unit relay lens system performing a single relay cycle which is composed, in order from the object side, of a bar-shaped lens component $L_1$ having convex surfaces on both sides, a lens component $L_2$ which has concave surfaces on both the sides thereof and a negative refractive power, and a bar-shaped lens component $L_3$ having convex surfaces on both the sides thereof.

As another conventional example of relay optical system of this type, there is known the optical system disclosed by Japanese Patent Kokai Publication No. Hei 4-93,909. This conventional example has a composition shown in FIG. 5, or is composed, in order from the object side, of a cemented lens component consisting of a bar-shaped biconvex lens element $L_4$ and a negative meniscus lens element $L_5$, and another cemented lens component consisting of a negative meniscus lens element $L_6$ and a bar-shaped convex lens element $L_7$ as illustrated in FIG. 5. For obtaining a disposable endoscope, it is desirable to configure the endoscope so that it can be manufactured at a low cost. Since a non-flexible endoscope comprises a relay optical system for relaying an image by a plurality of cycles, it is desirable for reducing a prime cost thereof to minimize a number of parts required for composing a unit relay lens system performing a single relay cycle.

However, the conventional relay optical system shown in FIG. 4 or disclosed by Japanese Patent Kokai Publication No. Hei 2-272,512 undesirably undercorrects spherical aberration produced by the biconcave lens component $L_2$.

Further, the image relay optical system shown in FIG. 5 or disclosed by Japanese Patent Kokai Publication No. Hei 4-93,909 is also undesirable since it requires complicated assembling steps and a large number of parts due to the fact that the optical system uses the cemented lens component consisting of the bar-shaped biconvex lens element $L_4$ and the negative meniscus lens element $L_5$ as well as the cemented lens component consisting of the negative meniscus lens element $L_6$ and the bar-shaped biconvex lens element $L_7$.

SUMMARY OF THE INVENTION

A primary object of the present invention is to provide a non-flexible endoscope having an insertion section and an eyepiece section which are separable from each other, and comprising an optical system for non-flexible endoscopes which uses an observation optical system disposed in the insertion section, configured so as to be manufacturable at a cost low enough to make the insertion section disposable and structured so as to correct chromatic aberration favorably in the optical system as a whole.

Another object of the present invention is to provide a relay optical system comprising unit relay lens system or relay modules,each consisting of a small number of lens elements and an optical system for non-flexible endoscopes comprising the relay optical system.

The optical system for non-flexible endoscopes according to the present invention is intended for use with non-flexible endoscopes having insertion sections and eyepiece sections which are separable from each other, and configured so as to correct longitudinal chromatic aberration favorably in the optical system, for non-flexible endoscopes as a whole while correcting longitudinal chromatic aberration produced by the observation optical system of the optical system for non-flexible endoscopes to be disposed in the insertion sections of the non-flexible endoscopes with the eyepiece optical system to be disposed in the eyepiece sections of the non-flexible endoscopes.

Owing to the composition described above, the optical system for non-flexible endoscopes according to the present invention is capable of favorably correcting longitudinal chromatic aberration in the optical system for non-flexible endoscopes as a whole correcting longitudinal chromatic aberration which is inevitably produced by the observation optical system to be disposed in the insertion sections by producing reverse longitudinal chromatic aberration with the eyepiece optical system even when the observation optical system is configured so as to be manufacturable at a cost low enough to make the observation optical system disposable.

Further, the optical system for non-flexible endoscope systems is intended for use with non-flexible endoscope systems each consisting of insertion sections, adaptors and cameras which are separable from one another, and configured so as to correct longitudinal chromatic aberration favorable in the optical system for non-flexible endoscopes systems as a whole while correcting longitudinal chromatic aberration produced by the observation optical system to be disposed in the insertion sections with an imaging optical system to be disposed in the adaptors or the cameras.

This optical system for non-flexible endoscope systems is also capable of favorably correcting longitudinal chromatic aberration produced by the observation optical system even when it is configured so as to be manufacturable at a low cost.

Further, the relay optical system to be used in non-flexible endoscopes comprises unit relay lens systems each consisting of three or a smaller number of lens elements having a positive refractive power and having at least one aspherical surface for favorably correcting spherical aberration.

FIG. 6 shows a sectional view schematically descriptive of a non-flexible endoscope to which the optical system for non-flexible endoscopes according to the present invention is applicable. The non-flexible endoscope shown in FIG. 6 is devided into an insertion section 1 and an eyepiece section 2. The insertion section 1 comprises an objective optical system O and a relay optical system R which functions to consecutively reimaging an image P of an object formed by the objective optical system for leading the image to the eyepiece section. In the example shown in FIG. 6, a lens component disposed on the object side in the eyepiece optical system shares the functions of the relay optical system and an image of the object is formed in the eyepiece optical system E. Plane plates C which are disposed before and after the eyepiece optical system E are cover glass plates.

The insertion section 1 and the eyepiece section 2 of the non-flexible endoscope are attachable and detachable to and from each other by using an adequate mechanism. The sections 1 and 2 are attached to each other for observing an image of an object through the eyepiece section E and detached from each other after the observation for discarding the insertion section 1.

On the other hand, FIG. 7 shows a non-flexible endoscope which consists of an insertion section 1, an adaptor 2 for TV cameras and a camera head 4. The adaptor 3 for TV cameras comprises an imaging lens system T, whereas the camera head has a built-in CCD sensor 11. In case of the non-flexible endoscope shown in FIG. 7, the insertion section 1, the adaptor 3 and the camera head 4 are attachable and detachable to and from one another by using adequate mechanisms. When these members are attached to one another for observation through the non-flexible endoscope, an image $P_L$ which has been transmitted through the relay optical system R disposed in the insertion section 1 is reimaged by the imaging lens system T built in the adaptor 3 onto the CCD image sensor disposed in the camera head. Video signals generated by the CCD image sensor are used for displaying the image on a monitor TV (not shown) for observation, whereafter the insertion section 1, the adaptor 3 and the camera head 4 are detached from one another for discarding the insertion section 1.

The optical system for non-flexible endoscope according to the present invention, which is to be used with non-flexible endoscopes having the configuration described above, is configured on the basis of a design concept that the observation optical system to be disposed in the insertion section 1 will have a composition as simple as possible, whereas parts and structures which inevitably require high manufacturing costs are to be disposed in the eyepiece section 2, the adaptor 3 and so on. In other words, the optical systems to be disposed in the insertion section 1 have compositions as simple as possible, and an aberration correcting optical system is disposed in the eyepiece section 2 or the adaptor 3 for correcting aberrations remaining after the objective optical system and the relay optical system or obtaining favorably corrected aberrations in the optical system for non-flexible endoscopes as a whole. Even if this design concept results in complication of compositions of the optical systems to be disposed in the eyepiece section and the adaptor, and enhancement of manufacturing costs thereof, no problem is posed since these sections are not discarded.

FIG. 8 exemplifies a measure for preventing sections other than the insertion section 1 from being contaminated. In the example shown in FIG. 8, an endoscope system consists of an insertion section 1, an eyepiece section 2 and a TV camera 4 attached to the eyepiece section 2, and is equipped with a sterilizing cover 10 which is integrated at a tip thereof with the insertion section 1 for accommodating the eyepiece section and members disposed thereafter. This measure permits keeping the eyepiece section 2 and the members disposed thereafter by discarding the insertion section 1 together with the sterilizing cover 10 after observation of an image through a non-flexible endoscope.

The optical system for non-flexible endoscopes according to the present invention is characterized in that the observation optical system to be disposed in the insertion section consists of the objective optical system O and the relay optical system R, that the relay optical system consists of the unit relay lens systems each composed of three or a smaller number of lens elements and that at least one aspherical surface is used on the lens elements.

FIG. 10 exemplifies an overall configuration of a non-flexible endoscope using the relay optical system R according to the present invention which consists of an objective optical system O and a relay optical system R disposed in an insertion section 1, and an eyepiece optical system E disposed in a detachable eyepiece section 2. The non-flexible endoscope shown in this drawing also has the insertion section 1 and the eyepiece section 2 which are separable from each other so that the insertion section 1 can be discarded and the eyepiece section 2 is reusable.

The optical system for non-flexible endoscopes according to the present invention which is to be used with the non-flexible endoscope shown in FIG. 10 has an observation optical system wherein three lens elements. L are disposed with airspaces D reserved therebetween, for example, as shown in FIG. 9 to perform a single relay cycle. This optical system for non-flexible endoscopes uses substantially two lens elements for a single relay cycle and is composed of a very small number of parts. A prime cost of this optical system for non-flexible endoscopes can be reduced by selecting a common material for the lens elements within a range as broad as possible, or adopting two or a smaller number of material for the lens elements. The prime cost of the optical system for non-flexible endoscopes can further be reduced by selecting plastic materials for the lens elements.

Though chromatic aberration is not corrected by using cemented lens components disposed in the relay optical system, spherical aberration is corrected favorably in the optical system for non-flexible endoscope by using at least one aspherical surface having curvature which is lowered as portions of the aspherical surface are farther from the optical axis toward the marginal portions as described above. Further, chromatic aberration can also be corrected to such a level as to be sufficiently allowable in disposable non-flexible endoscopes.

In case of the non-flexible endoscope shown in FIG. 10, it is possible to correct chromatic aberration favorably in the optical system for non-flexible endoscope as a whole by overcorrecting chromatic aberration with a cemented lens component which is disposed in the detachable eyepiece optical system E so that chromatic aberration produced by the optical system composed of the objective optical system O and the relay optical system R is corrected by the eyepiece optical system E.

It is desirable to configure the aspherical surface so as to satisfy the following condition (1):

$$-3 < P < 0 \qquad (1)$$

wherein the reference symbol P represents a value of the coefficient P used in the following formula expressing a shape of the aspherical surface:

$$x=(y^2/r)/[1+\{1-P(y/r)^2\}^{1/2}]$$

wherein the reference symbol x represents a direction along the optical axis, the reference symbol y designates a direction perpendicular to the optical axis and the reference symbol r denotes a radius of curvature on a reference sphere of the aspherical surface.

If the upper limit of 0 of the condition (1) is exceeded, the aspherical surface will have a shape having a refractive power which is strengthened as portions of the aspherical surface are farther from the optical axis toward the marginal portions thereof, thereby undesirably undercorrecting spherical aberration. If the lower limit of −3 of the condition (1) is exceeded, in contrast, the marginal portions of the aspherical surface will have too weak a refractive power, thereby undesirably overcorrecting spherical aberration.

BRIEF DESCRIPTION OF THE DRAWINGS

FIG. 13 through FIG. 16 show sectional views illustrating compositions of a third embodiment through a sixth embodiment of the present invention;

FIG. 17A, FIG. 17B, FIG. 17C and FIG. 17D show graphs visualizing aberration characteristics of the first embodiment of the present invention;

FIG. 18A, FIG. 18B, FIG. 18C and FIG. 18D show graphs visualizing aberration characteristics of the second embodiment of the present invention;

FIG. 19A, FIG. 19B, FIG. 19C and FIG. 19D show curves illustrating aberration characteristics of the third embodiment of the present invention;

FIG. 20A, FIG. 20B, FIG. 20C and FIG. 20D show curves illustrating aberration characteristics of the fourth embodiment of the present invention;

FIG. 21A, FIG. 21B, FIG. 21C and FIG. 21D show curves illustrating aberration characteristics of the fifth embodiment of the present invention; and FIG. 22A, FIG. 22B, FIG. 22C and FIG. 22D show curves illustrating aberration characteristics of the sixth embodiment of the present invention.

DETAILED DESCRIPTION OF THE PREFERRED EMBODIMENTS

Now, the present invention will be described more detailedly below with reference to the preferred embodiments of the optical system for non-flexible endoscopes and the relay optical system of the optical system illustrated in the accompanying drawings.

The first embodiment and the second embodiment of the present invention which have the numerical data listed below are configured in particular so as to correct longitudinal chromatic aberration produced by an objective optical system O and a relay optical system R disposed in an insertion section by using an eyepiece optical system disposed in an eyepiece section.

Figure 6:
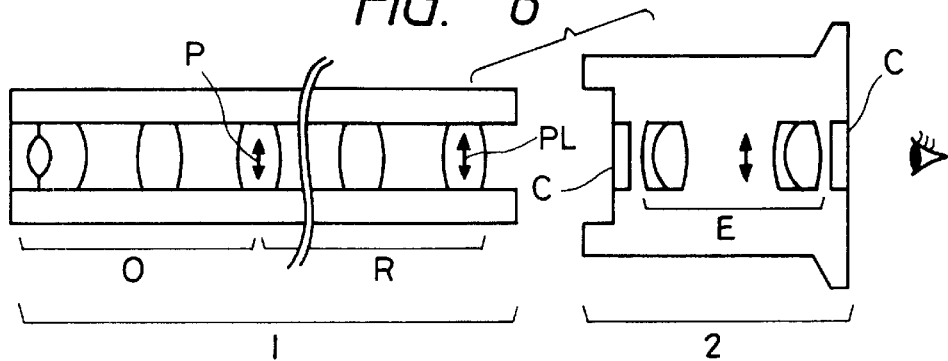
FIG. 6 shows a sectional view illustrating a composition of a disposable type non-flexible endoscope using the optical system for non-flexible endoscopes according to the present invention.
Figure 11:
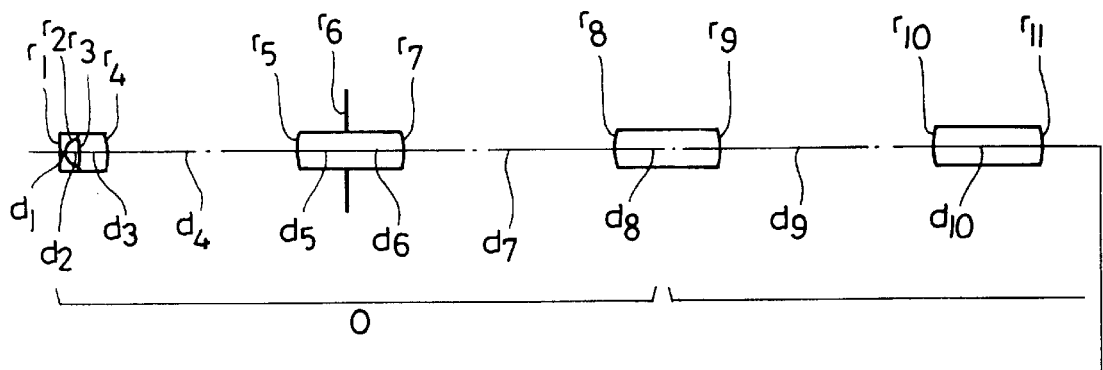
FIG. 11 and FIG. 12 show sectional views illustrating compositions of a first embodiment and a second embodiment respectively of the present invention.
Figure 11:
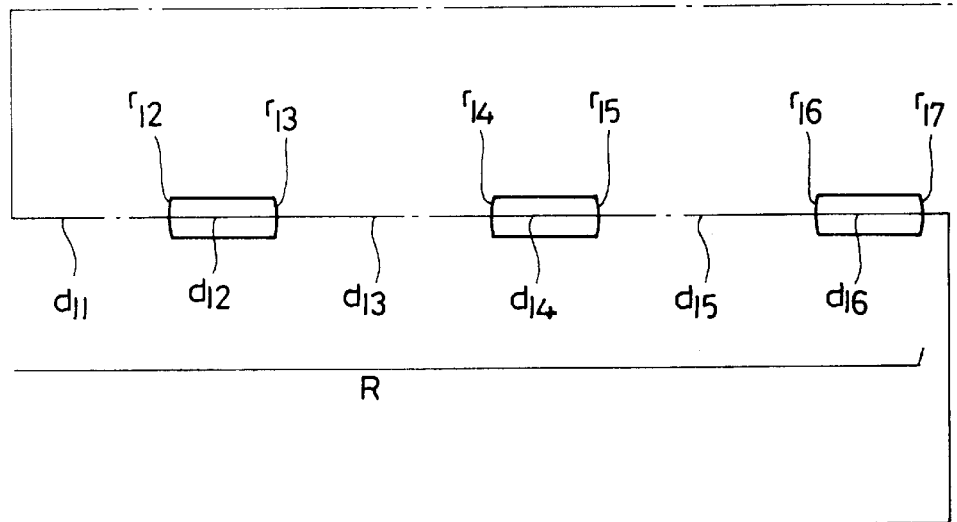
Figure 11:
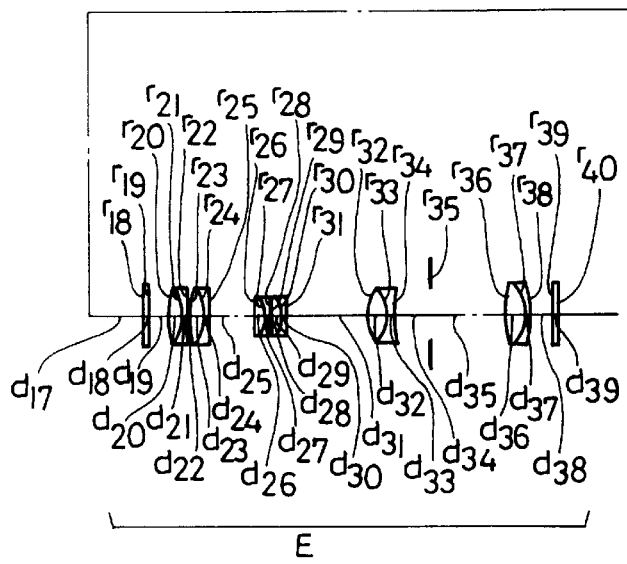

A sectional view illustrating a composition of the first embodiment of the optical system according to the present invention is shown in FIG. 11, wherein the reference symbol O represents the objective optical system, the reference symbol R designates the relay optical system and the reference symbol E denotes the eyepiece optical system. The optical system preferred as the first embodiment of the present invention is intended for use in such a non-flexible endoscope as that shown in FIG. 6 and has the numerical data listed below:

First Embodiment object distance = −35, viewing diopter = −1 m$^{-1}$,
NA for incident rays = 0.0076, field angle = 70°
image height = 1.48

| | | |
|---|---|---|
| $r_1 = \infty$ | | |
| $d_1 = 0.7000$ | $n_1 = 1.52566$ | $v_1 = 56.28$ |
| $r_2 = 1.5912$ | (aspherical surface) | |
| $d_2 = 3.1900$ | | |
| $r_3 = -11.7850$ | | |
| $d_3 = 4.9000$ | $n_2 = 1.52566$ | $v_2 = 56.28$ |
| $r_4 = -11.0852$ | (aspherical surface) | |
| $d_4 = 34.8500$ | | |
| $r_5 = 24.6414$ | (aspherical surface) | |
| $d_5 = 8.8741$ | $n_3 = 1.52566$ | $v_3 = 56.28$ |
| $r_6 = \infty$ | (imaginary stop) | |
| $d_6 = 10.6659$ | $n_4 = 1.52566$ | $v_4 = 56.28$ |
| $r_7 = -24.6414$ | (aspherical surface) | |
| $d_7 = 38.7900$ | | |
| $r_8 = 24.6414$ | (aspherical surface) | |
| $d_8 = 19.5400$ | $n_5 = 1.52566$ | $v_5 = 56.28$ |
| $r_9 = -24.6414$ | (aspherical surface) | |
| $d_9 = 39.4600$ | | |
| $r_{10} = 24.6414$ | (aspherical surface) | |
| $d_{10} = 19.5400$ | $n_6 = 1.52566$ | $v_6 = 56.28$ |
| $r_{11} = -24.6414$ | (aspherical surface) | |
| $d_{11} = 39.4600$ | | |
| $r_{12} = 24.6414$ | (aspherical surface) | |
| $d_{12} = 19.5400$ | $n_7 = 1.52566$ | $v_7 = 56.28$ |
| $r_{13} = -24.6414$ | (aspherical surface) | |
| $d_{13} = 39.4600$ | | |
| $r_{14} = 24.6414$ | (aspherical surface) | |
| $d_{14} = 19.5400$ | $n_8 = 1.52566$ | $v_8 = 56.28$ |
| $r_{15} = -24.6414$ | (aspherical surface) | |
| $d_{15} = 39.4600$ | | |
| $r_{16} = 24.6414$ | (aspherical surface) | |
| $d_{16} = 19.5400$ | $n_9 = 4.52566$ | $v_9 = 56.28$ |
| $r_{17} = -24.6414$ | (aspherical surface) | |
| $d_{17} = 15.000$ | | |
| $r_{18} = \infty$ | | |
| $d_{18} = 1.0000$ | $n_{10} = 1.51633$ | $v_{10} = 64.15$ |
| $r_{19} = \infty$ | | |
| $d_{19} = 3.5400$ | | |
| $r_{20} = 26.3700$ | | |

-continued

First Embodiment

| | | |
|---|---|---|
| $d_{20} = 2.5000$ | $n_{11} = 1.77250$ | $v_{11} = 49.60$ |
| $r_{21} = -8.6370$ | | |
| $d_{21} = 1.0000$ | $n_{12} = 1.84666$ | $v_{12} = 23.78$ |
| $r_{22} = -90.9350$ | | |
| $d_{22} = 0.5000$ | | |
| $r_{23} = 26.3700$ | | |
| $d_{23} = 2.5000$ | $n_{13} = 1.77250$ | $v_{13} = 49.60$ |
| $r_{24} = -8.6370$ | | |
| $d_{24} = 1.0000$ | $n_{14} = 1.84666$ | $v_{14} = 23.78$ |
| $r_{25} = -90.9350$ | | |
| $d_{25} = 7.9500$ | | |
| $r_{26} = \infty$ | | |
| $d_{26} = 2.0000$ | $n_{15} = 1.77250$ | $v_{15} = 49.60$ |
| $r_{27} = -5.3520$ | | |
| $d_{27} = 1.0000$ | $n_{16} = 1.78472$ | $v_{16} = 25.71$ |
| $r_{28} = \infty$ | | |
| $d_{28} = 0.0300$ | | |
| $r_{29} = \infty$ | | |
| $d_{29} = 2.0000$ | $n_{17} = 1.77250$ | $v_{17} = 49.60$ |
| $r_{30} = -5.3520$ | | |
| $d_{30} = 1.0000$ | $n_{18} = 1.78472$ | $v_{18} = 25.71$ |
| $r_{31} = \infty$ | | |
| $d_{31} = 14.6100$ | | |
| $r_{32} = 9.0340$ | | |
| $d_{32} = 3.8000$ | $n_{19} = 1.77250$ | $v_{19} = 49.60$ |
| $r_{33} = -6.4830$ | | |
| $d_{33} = 1.0000$ | $n_{20} = 1.84666$ | $v_{20} = 23.78$ |
| $r_{34} = 24.0550$ | | |
| $d_{34} = 6.9800$ | | |
| $r_{35} = \infty$ | | |
| $d_{35} = 13.3700$ | | |
| $r_{36} = 19.7060$ | | |
| $d_{36} = 3.5000$ | $n_{21} = 1.69680$ | $v_{21} = 55.53$ |
| $r_{37} = -7.8250$ | | |
| $d_{37} = 1.0000$ | $n_{22} = 1.80610$ | $v_{22} = 40.95$ |
| $r_{38} = -17.4010$ | | |
| $d_{38} = 4.0400$ | | |
| $r_{39} = \infty$ | | |
| $d_{39} = 1.0000$ | $n_{23} = 1.51633$ | $v_{23} = 64.15$ |
| $r_{40} = \infty$ | | | aspherical surface coefficient
(2nd surface) K =−0.8146, (4th surface) K =5.9508
(5th surface) K =−2.3156, (7th surface) K =−2.3156
(8th surface) K =−2.3156, (9th surface) K =−2.3156
(10th surface) K =−2.3156, (11th surface) K =−2.3156
(12th surface) K =−2.3156, (13th surface) K =−2.3156
(14th surface) K =−2.3156, (15th surface) K =−2.3156
(16th surface) K =−2.3156, (17th surface) K =−2.3156

In the numerical data listed above, the reference symbols $r_1, r_2, \ldots$ represent radii of curvature on respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements, and the reference symbols $v_1, v_2, \ldots$ represent Abbe's numbers of the respective lens elements.

Further, the aspherical surfaces used in the first embodiment has shapes which are expressed by the following formula:

$$z=(y^2/r)/[1+\{1-(k+1)(y/r)^2\}^{1/2}]$$

wherein the reference symbol z represents a distance as measured from an intersection between an aspherical surface of interest and an optical axis in a direction along the optical axis, the reference symbol y designates a distance as measured from the optical axis, the reference symbol r denotes a radius of curvature on the aspherical surface and the reference symbol k represents a parameter expressing a shape of a quadratic surface.

In the first embodiment described above, $r_1$ through $r_{17}$ correspond to an observation optical system which is disposed in the insertion section. Rays were traced through this observation optical system only from the object side toward the eyepiece section. This tracing indicated that longitudinal chromatic aberration at a location of a final image point of the observation optical system was as specified below:

C-line: 1.395, F-line: −3.519 and g-line: −6.650

These values are specified taking an imaging point of the d-line as standard and taking a direction toward the eyepiece section as positive.

Furthermore, $r_{18}$ through $r_{40}$ correspond to the eyepiece optical system. Longitudinal chromatic aberration at a final image location of the eyepiece optical system which was determined by tracing rays through the eyepiece optical system only from the side of an eye point thereof toward the insertion section was as specified below:

C-line: −1.032, F-line: 3.299 and g-line: 7.205

These values are specified taking an imaging point of the d-line as standard and taking a direction toward the insertion section as positive.

The observation optical system (the objective optical system O and the relay optical system R) which is disposed in the insertion section 1 of the first embodiment consists only of lens component each composed of a single lens element and comprises no cemented lens component. Positive lens components such as those used in this observation optical system ordinarily produce negative longitudinal chromatic aberration (rays having short wavelengths are imaged on the object side of imaging points of rays having long wavelengths). When these lens components are negative, they produce positive longitudinal chromatic aberration.

In the first embodiment, the objective optical system O used in the observation optical system which is disposed in the insertion section comprises a negative lens component. This negative lens component is adopted for widening a field angle of the optical system and correcting curvature of field, but scarecely serves for correction of longitudinal chromatic aberration. Since all the lens components other than the negative lens component which are disposed in the observation optical system are positive, the observation optical system disposed in the insertion section produces negative chromatic aberration at a high possibility even when the lens components are made of optical materials having low dispersing powers. As a result, negative chromatic aberration remains after the observation optical system disposed in the insertion section.

In contrast, the eyepiece optical system E comprises a large number of cemented lens components which produce positive longitudinal chromatic aberration or allows remarkable positive longitudinal chromatic aberration to remain therein. Longitudinal chromatic aberration determined by tracing rays in the reverse direction through the eyepiece optical system E only has a sign and a value in absolute which are reverse and nearly equal respectively to those of the longitudinal chromatic aberration remaining after the observation optical system disposed in the insertion section. When the insertion section is attached to the eyepiece section, locations of images formed by modules used in both the optical systems are matched with each other at each wavelength in a section of the attachment, whereby longitudinal chromatic aberration is corrected to a level sufficient for practical use in the optical system for non-flexible endoscopes as a whole which consists of the observation optical system disposed in the insertion section and the eyepiece optical system E.

FIG. 17A through FIG. 17D illustrate aberration characteristics of the optical system for non-flexible endoscopes as a whole which consists of the observation optical system and the eyepiece optical system. As is seen from these drawings, diopter deviations for the C-line, F-line and g-line which are caused due to longitudinal chromatic aberration are limited within a range of $\pm 2m^{-1}$ which is allowable for observation by human eyes. Further, the other aberrations are also corrected favorably.

The first embodiment of the present invention is applicable not only to non-flexible endoscopes for observation by human eyes but also to non-flexible endoscopes exclusively for observation on TV monitors.

Figure 7:
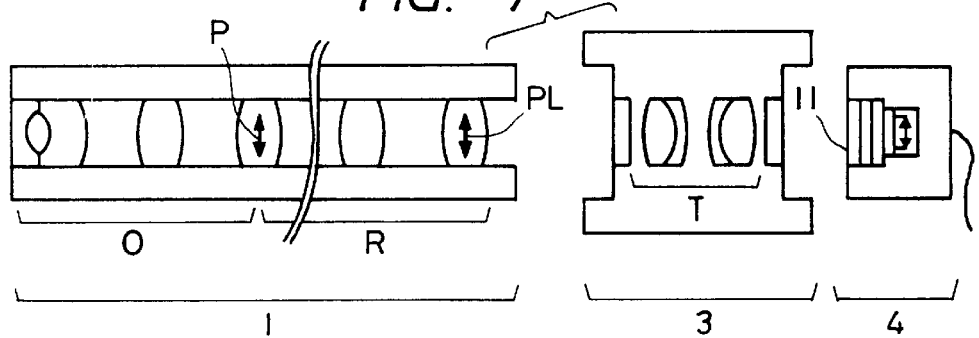
FIG. 7 shows a sectional view illustrating a composition of a disposable type non-flexible endoscope for observation on a TV monitor using the optical system for non-flexible endoscope system according to the present invention.
Figure 8:
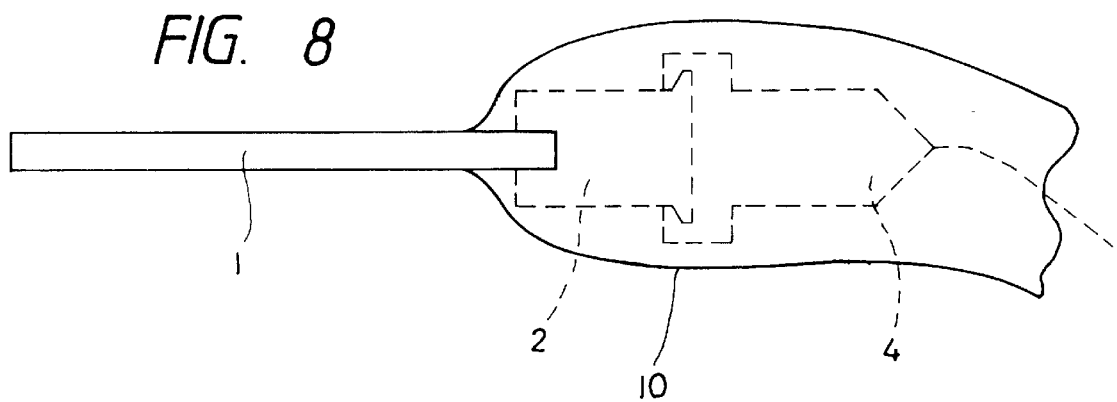
FIG. 8 shows a sectional view illustrating an insertion section of a non-flexible endoscope which is equipped with a sterilizing cover.
Figure 9:
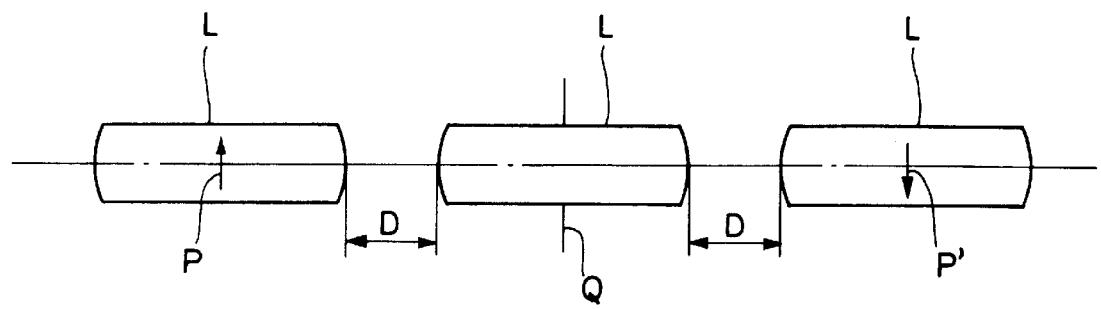
FIG. 9 shows a sectional view illustrating a composition of a non-flexible endoscope comprising the relay optical system according to the present invention.
Figure 10:
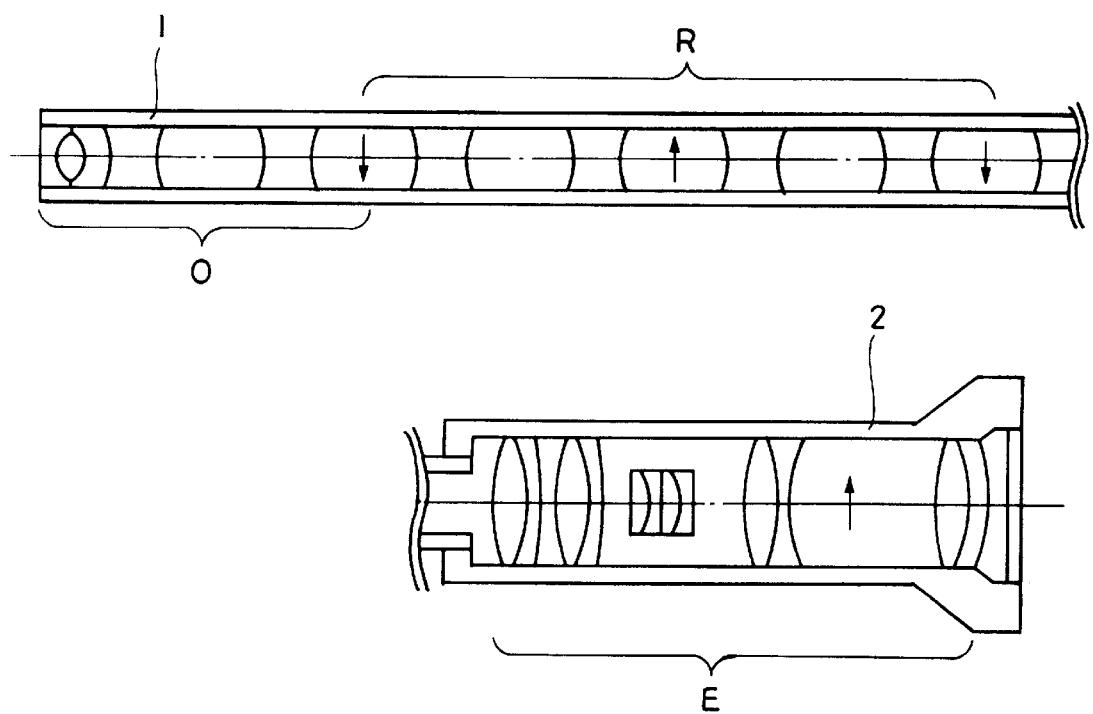
FIG. 10 shows a sectional view illustrating a fundamental composition of the relay optical system according to the present invention.
Figure 12:
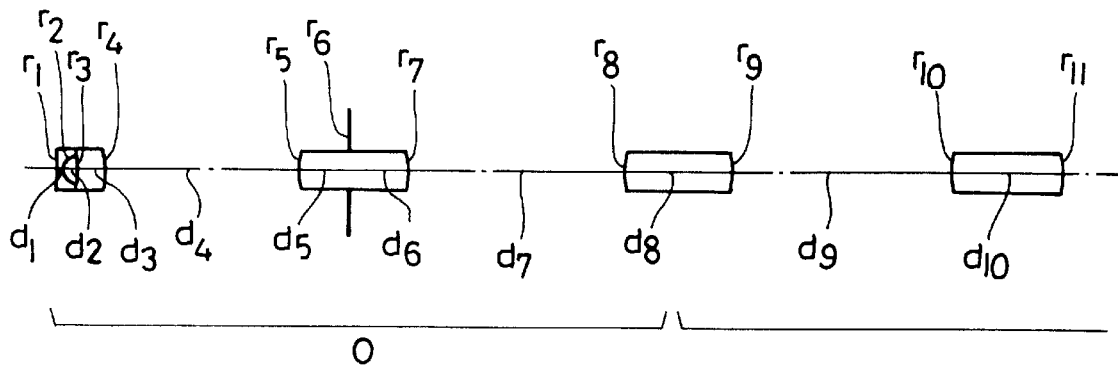
Figure 12:
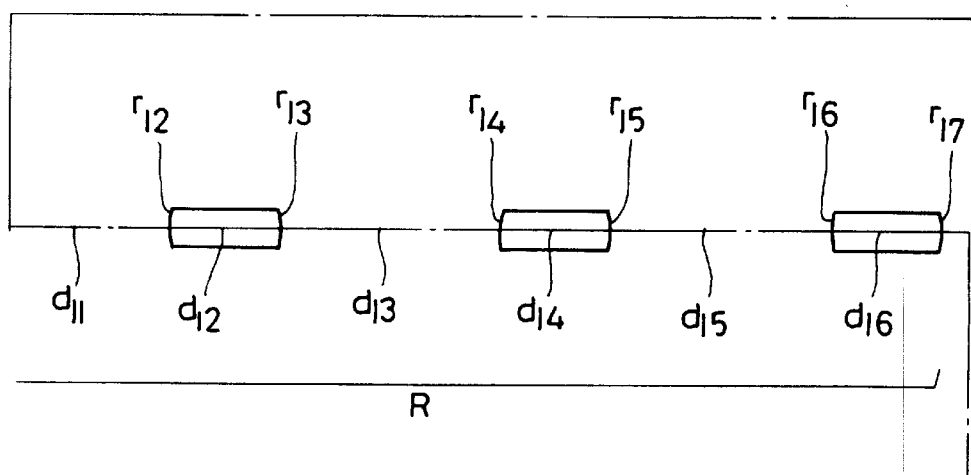
Figure 12:
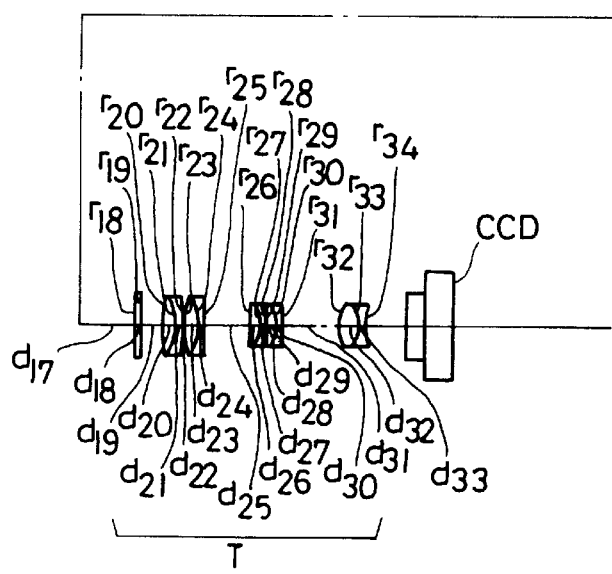

The optical system preferred as the second embodiment of the present invention is an optical system which is to be used with a non-flexible endoscope system for observation on a TV monitor such as that shown in FIG. 7 and has a composition illustrated in FIG. 12. The second embodiment of the present invention has the numerical data which is listed below:

| Second Embodiment | | | |
|---|---|---|---|
| object distance = −35, NA for incident rays = 0.0076, field angle = 70°, image height = 2.14 | | | |
| $r_1 = \infty$ | | | |
| $d_1 = 0.7000$ | $n_1 = 1.52566$ | | $\nu_1 = 56.28$ |
| $r_2 = 1.5912$ | (aspherical surface) | | |
| $d_2 = 3.1900$ | | | |
| $r_3 = -11.7850$ | | | |
| $d_3 = 4.9000$ | $n_2 = 1.52566$ | | $\nu_2 = 56.28$ |
| $r_4 = -11.0852$ | (aspherical surface) | | |
| $d_4 = 34.8500$ | | | |
| $r_5 = 24.6414$ | (aspherical surface) | | |
| $d_5 = 8.8741$ | $n_3 = 1.52566$ | | $\nu_3 = 56.28$ |
| $r_6 = \infty$ | (imaginary stop) | | |
| $d_6 = 10.6659$ | $n_4 = 1.52566$ | | $\nu_4 = 56.28$ |
| $r_7 = -24.6414$ | (aspherical surface) | | |
| $d_7 = 38.7900$ | | | |
| $r_8 = 24.6414$ | (aspherical surface) | | |
| $d_8 = 19.5400$ | $n_5 = 1.52566$ | | $\nu_5 = 56.28$ |
| $r_9 = -24.6414$ | (aspherical surface) | | |
| $d_9 = 39.4600$ | | | |
| $r_{10} = 24.6414$ | (aspherical suarface) | | |
| $d_{10} = 19.5400$ | $n_6 = 1.52566$ | | $\nu_6 = 56.28$ |
| $r_{11} = -24.6414$ | (aspherical surface) | | |
| $d_{11} = 39.4600$ | | | |
| $r_{12} = 24.6414$ | (aspherical surface) | | |
| $d_{12} = 19.5400$ | $n_7 = 1.52566$ | | $\nu_7 = 56.28$ |
| $r_{13} = -24.6414$ | (aspherical surface) | | |
| $d_{13} = 39.4600$ | | | |
| $r_{14} = 24.6414$ | (aspherical surface) | | |
| $d_{14} = 19.5400$ | $n_8 = 1.52566$ | | $\nu_8 = 56.28$ |
| $r_{15} = -24.6414$ | (aspherical surface) | | |
| $d_{15} = 39.4600$ | | | |
| $r_{16} = 24.6414$ | (aspherical surface) | | |
| $d_{16} = 19.5400$ | $n_9 = 1.52566$ | | $\nu_9 = 56.28$ |
| $r_{17} = -24.6414$ | (aspherical surface) | | |
| $d_{17} = 15.0000$ | | | |
| $r_{18} = \infty$ | | | |
| $d_{18} = 1.0000$ | $n_{10} = 1.51633$ | | $\nu_{10} = 64.15$ |
| $r_{19} = \infty$ | | | |
| $d_{19} = 3.5400$ | | | |
| $r_{20} = 26.3700$ | | | |
| $d_{20} = 2.5000$ | $n_{11} = 1.77250$ | | $\nu_{11} = 49.60$ |
| $r_{21} = -8.6370$ | | | |
| $d_{21} = 1.0000$ | $n_{12} = 1.84666$ | | $\nu_{12} = 23.78$ |
| $r_{22} = -90.9350$ | | | |
| $d_{22} = 0.5000$ | | | |
| $r_{23} = 26.3700$ | | | |
| $d_{23} = 2.5000$ | $n_{13} = 1.77250$ | | $\nu_{13} = 49.60$ |
| $r_{24} = -8.6370$ | | | |
| $d_{24} = 1.0000$ | $n_{14} = 1.84666$ | | $\nu_{14} = 23.78$ |
| $r_{25} = -90.9350$ | | | |
| $d_{25} = 7.9500$ | | | |
| $r_{26} = \infty$ | | | |

-continued

| Second Embodiment | | |
|---|---|---|
| $d_{26} = 2.0000$ | $n_{15} = 1.77250$ | $\nu_{15} = 49.60$ |
| $r_{27} = -5.3520$ | | |
| $d_{27} = 1.0000$ | $n_{16} = 1.78472$ | $\nu_{16} = 25.71$ |
| $r_{28} = \infty$ | | |
| $d_{28} = 0.0300$ | | |
| $r_{29} = \infty$ | | |
| $d_{29} = 2.0000$ | $n_{17} = 1.77250$ | $\nu_{17} = 49.60$ |
| $r_{30} = -5.3520$ | | |
| $d_{30} = 1.0000$ | $n_{18} = 1.78472$ | $\nu_{18} = 25.71$ |
| $r_{31} = \infty$ | | |
| $d_{31} = 9.9713$ | | |
| $r_{32} = 6.5209$ | | |
| $d_{32} = 3.8000$ | $n_{19} = 1.77250$ | $\nu_{19} = 49.60$ |
| $r_{33} = -4.3080$ | | |
| $d_{33} = 1.0000$ | $n_{20} = 1.84666$ | $\nu_{20} = 23.78$ |
| $r_{34} = 8.0115$ | | | aspherical surface coefficient
(2nd surface) K =−0.8146, (4th surface) K =5.9508
(5th surface) K =−2.3156, (7th surface) K =−2.3156
(8th surface) K =−2.3156, (9th surface) K =−2.3156
(10th surface) K =−2.3156, (11th surface) K =−2.3156
(12th surface) K =−2.3156, (13th surface) K =−2.3156
(14th surface) K =−2.3156, (15th surface) K =−2.3156
(16th surface) K =−2.3156, (17th surface) K =−2.3156

In the numerical data of the second embodiment listed above, the reference symbols $r_1$ through $r_{17}$ represent an observation optical system which is the same as that used in the first embodiment and has longitudinal chromatic aberration which is the same as that in the first embodiment. Further, the reference symbols $r_{18}$ through $r_{34}$ designate an imaging optical system T for a TV camera. By tracing rays through this imaging optical system from a side of a solid-stage image pickup device toward the insertion section, longitudinal chromatic aberration in the imaging optical system was specified as follows:

C-line: −1.165, F-line: 3.682 and g-line: 8.027

These values are specified taking an imaging point of the d-line as standard and taking a direction toward the insertion section as positive.

The non-flexible endoscope preferred as the second embodiment consists of an insertion section which is also disposable and an adaptor 3 for TV cameras which is reusable. Like the first embodiment, the second embodiment selects a simple composition for the insertion section for reducing a manufacturing cost thereof and uses expensive parts mainly in the adaptor for TV cameras which is reusable. In the second embodiment, the imaging optical system may be disposed in an integrated member which consists of the adaptor and a TV camera.

The optical system of the second embodiment uses a large number of cemented lens components in the imaging optical system T for TV cameras so that remarkable positive longitudinal chromatic aberration remains in the imaging optical system T alone. This positive longitudinal chromatic aberration, like that produced by the cemented lens components used in the first embodiment, serves for correcting negative longitudinal chromatic aberration produced by the observation optical system disposed in the insertion section.

FIG. 18A through FIG. 18D show graphs illustrating aberration characteristics of the optical system for non-flexible endoscopes as a whole which consists of the observation optical system disposed in the insertion section and the imaging optical system T for TV cameras. Since the imaging optical system T for TV cameras used in the second embodiment has a paraxial magnification of approximately 1×, it is possible to compare longitudinal chromatic aberration on a final image formed in the observation optical system disposed in the insertion section with that in the optical system for non-flexible endoscopes as a whole. As is seen from FIG. 18A, longitudinal chromatic aberration on the final image in the observation optical system disposed in the insertion section is remarkably corrected so as to obtain favorable longitudinal chromatic aberration in the optical system for non-flexible endoscopes as a whole. The other aberrations are corrected favorably in the optical system for non-flexible endoscopes as a whole.

Now, the first and second embodiments of the present invention will be described more detailedly below:

The first and second embodiments use the same observation optical system in the insertion sections thereof. Selected as an optical material for the lens components of the observation optical system disposed in the insertion sections is an optical plastic material having a low dispersing power. Since the non-flexible endoscope according to the present invention is configured so as to use a disposable insertion section, it is desirable that the lens components composing the observation optical system disposed in the insertion section can be made of a plastic material so as to permit reducing manufacturing costs thereof by mass production. Further, since a large number of aspherical surfaces are used on the lens components composing the observation optical system disposed in the insertion section, mass production of these lens components is ordinarily impossible and manufacturing costs thereof are high when these lens components are made of a glass material and the aspherical surfaces are formed by polishing the lens components made of the glass material. However, mass production of lens components is possible when the lens components are manufactured by pressing glass materials. Therefore, the lens components which are to be used for composing the observation optical system may be manufactured by pressing a glass material.

The observation optical system disposed in the insertion section of each of the embodiments described above consists of eight lens components which have the same shape and are made of the same material, except for the two lens components which are disposed on the object side, as is seen from the numerical data listed above. Accordingly, the present invention makes it possible to shape lens components by using only three types of dies, thereby providing merits to reduce manufacturing cost of the dies and to use lens components of the same kind in a large number. Further the objective optical system, which ordinarily has the composition different from that of the relay optical system and a short total length, uses lens components common to those to be comprised in the relay optical system and has a total length substantially equal to that of the unit relay lens system for reducing a number of image relay cycles to be performed. Furthermore, the aspherical surfaces used in the relay optical system serve for correcting aberrations other than chromatic aberration, or controlling mainly spherical aberration and astigmatism. Taking into consideration a fact that negative spherical aberration is ordinarily produced by a relay optical system consisting only of spherical lens components each composed of a single lens element, spherical aberration is corrected in the relay optical system of the embodiments described above by using the aspherical surfaces which have such shapes as to lower curvature at the marginal portions thereof.

The insertion section described above makes it possible to remarkable reduce manufacturing costs of non-flexible endoscopes since manufacturing costs of parts of observation optical systems occupy high ratios of manufacturing costs of the non-flexible endoscopes.

The eyepiece optical system which is used in the first embodiment is not a simple magnifying lens system but a lens system configured so as to form a real image in the optical system itself. The real image is formed in the eyepiece optical system since it is necessary to form a pupil in the eyepiece optical system.

It is impossible to dispose a lens component in an eyepiece optical system which does not form an intermediate image like a magnifying lens system because a pupil is formed at a location which is substantially the same that of an eye point.

The eyepiece optical system used in the first embodiment (the eyepiece optical system to be used in the optical system for non-flexible endoscopes according to the present invention) must produce remarkable positive longitudinal chromatic aberration. When an attempt is made to produce remarkable longitudinal chromatic aberration only with lens components disposed apart from a pupil, however, the eyepiece optical system will produce remarkable lateral chromatic aberration as well. It is therefore necessary to dispose lens components in the vicinity of a pupil formed in the eyepiece optical system. For this reason, a real image is formed in the eyepiece optical system and a large number of cemented lens components are disposed in the vicinity of a pupil formed on the object side of the real image in the first embodiment. The first embodiment which is configured so as to form the real image in the eyepiece optical system thereof forms an erect image.

It is desirable that a number Noc of the cemented lens components to be disposed in the eyepiece optical system satisfies the following condition (4):

$$N_{oc} \geq N_R + 1 \tag{4}$$

wherein the reference symbol $N_R$ represents a number of relay cycles to be performed by the relay optical system disposed in the insertion section.

The conventional relay optical system which is configured so as to favorably correct longitudinal chromatic aberration ordinarily uses a cemented lens component for a single relay cycle. In the optical system for non-flexible endoscopes according to the present invention which uses no cemented lens component in the relay optical system thereof, the eyepiece optical system must bear a burden to correct longitudinal chromatic aberration. Further, since the eyepiece optical system performs one additional relay cycle for forming the intermediate image, the eyepiece optical system must use cemented lens components in a number of relay cycles to be performed by the relay optical system plus 1 and cannot correct longitudinal chromatic aberration when the eyepiece optical system uses cemented lens components in a smaller number.

In order to adjust deviations of a focusing point caused by the observation optical system disposed in the insertion section, it is desirable that the eyepiece optical system is equipped with a focusing mechanism. When lens components made of a plastic; material. are used in the observation optical system disposed in the insertion section, optical constants are largely varied due to variations of temperature and humidity, thereby causing remarkable deviations of the focusing point. Since it is impossible to adjust the focusing point only with the insertion section, blurring of images due to deviations of the focusing point cannot be prevented while maintaining a low manufacturing cost of the insertion section, without equipping the eyepiece section with a focusing mechanism for correcting the deviations of the focusing point of the observation optical system disposed in theinsertion section. A focusing mechanism to be adopted for this purpose may of a type which displaces an attached end of the insertion section in a direction along the optical axis or another type which displaces the eyepiece optical system as a whole in the direction along the optical axis in the eyepiece section. The focusing mechanism may of an inner focus type which displaces some of the lens components disposed in the eyepiece optical system in the direction along the optical axis.

Now, description will be made of the imaging optical system of the second embodiment which is to be used with TV cameras. A number $N_{TV}$ of cemented lens components to be disposed in the imaging optical system for the TV camera must satisfy the following condition (5):

$$N_{TV} \leq N_R + 1 \tag{5}$$

If the condition (5) is not satisfied, it will be impossible to correct logitudinal chromatic aberration.

In the non-flexible endoscope according to the present invention, which consists of the insertion section having the observation optical system, TV camera having the image pickup means and the adoptor comprising the imaging optical system for connecting the insertion section to the TV camera, it is desiable that the imaging optical system comprises at least one cemented lens component and satisfies the following condition:

$$N_A \leq N_R + 1$$

wherein the reference symbol $N_A$ represents a number of cemented lens components to be used in the imaging optical system.

Further, it is desirable that the imaging optical system for TV cameras is equipped with a focusing mechanism. This focusing mechanism may of a type which displaces the attached end of the insertion section in the direction along the optical axis. Further, the focusing mechanism may be of another type which displaces an imaging optical system for TV cameras as a whole in the direction along the optical system in an adaptor for TV cameras or a TV camera comprising the imaging optical system. Furthermore, the focusing mechanism may be of an inner focus type which displaces some of the lens components disposed in the imaging optical system for TV cameras. Moreover, the focusing mechanism may be of a type which displaces a solid-state image pickup device in the direction along the optical axis in a TV camera comprising an image pickup optical system.

Though descriptions have been made above of the disposable medical non-flexible endoscopes, the present invention makes it possible to reduce manufacturing costs of reusable non-flexible endoscopes whether they are intended for medical or industrial use.

Figure 1:
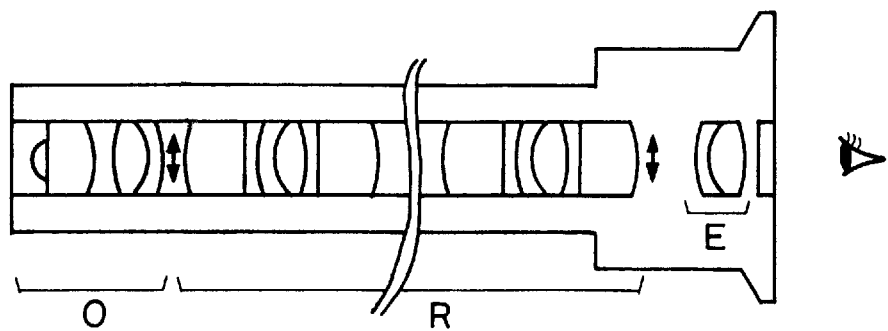
FIG. 1 shows a sectional view illustrating a composition of the conventional non-flexible endoscope.
Figure 2:
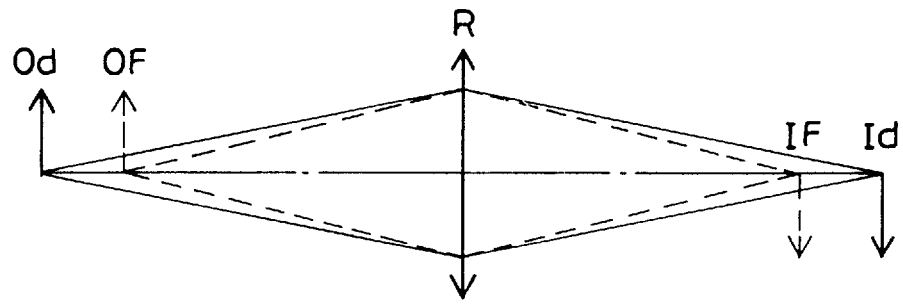
FIG. 2 shows a diagram illustrating relationship between rays used for imaging by a relay optical system.

The conventional non-flexible endoscope shown in FIG. 1 uses a large number of cemented lens components which are disposed in the insertion section thereof. The relay optical system, in particular, is obliged to use cemented lens components in a number of relay cycles to be performed by this optical system. Cemented lens components having high curvature in particular inevitably require manufacturing costs which are higher than those of lens components having large diameters. Cemented lens components which have small diameters can hardly be manufactured by automatic cementing processes and require high costs for cementing. A manufacturing cost of this conventional non-flexible endoscope can be lowered, though a number of parts required for composing the endoscope remains unchanged, by relocating the cemented lens components disposed in the insertion section, in particular those disposed in the relay optical system, into a section which is free from a restriction imposed on an outside diameter thereof other than the insertion section. It is therefore conceivable to dispose the optical system having the composition shown in FIG. 1 in a single non-flexible endoscope, or accommodate the objective optical system and the relay optical system in the insertion section, and dispose the eyepiece optical system in a section other than the insertion section respectively. In this case, longitudinal chromatic aberration produced by the objective optical system and the relay optical system is to be corrected by the eyepiece optical system.

The non-flexible endoscope according to the present invention has the configuration to make the insertion section separable from the eyepiece section and is configured so as to correct longitudinal chromatic aberration produced by the observation optical system disposed in the insertion section by the optical system disposed in the eyepiece section, thereby being highly effective for simplifying a composition and reducing a manufacturing cost of the insertion section so as to make it disposable.

Now, the preferred embodiments of the relay optical system for non-flexible endoscopes according to the present invention will be described. Each of the embodiments of the relay optical system uses three or a smaller number of lens components each composed of a single lens element for a single relay cycle, or is composed of an extremely small number of lens components.

The embodiments (third through sixth embodiments) of the relay optical system for the non-flexible endoscope according to the present invention have the numerical data which are listed below:

| Third Embodiment | | |
|---|---|---|
| $f = \infty$, NA = −0.076 | | |
| $r_1 = \infty$ | (image position) | |
| $d_1 = 9.1160$ | $n_1 = 1.52566$ | $v_1 = 56.28$ |
| $r_2 = -22.9660$ | (aspherical surface) | |
| $d_2 = 36.7680$ | | |
| $r_3 = 22.9660$ | (aspherical surface) | |
| $d_3 = 9.1160$ | $n_2 = 1.52566$ | $v_2 = 56.28$ |
| $r_4 = \infty$ | (pupil) | |
| $d_4 = 9.1160$ | $n_3 = 1.52566$ | $v_3 = 56.28$ |
| $r_5 = -22.9660$ | (aspherical surface) | |
| $d_5 = 36.7680$ | | |
| $r_6 = 22.9660$ | (aspherical surface) | |
| $d_6 = 9.1160$ | $n_4 = 1.52566$ | $v_4 = 56.28$ |
| $r_7 = \infty$ | (image position) | | aspherical surface coefficient
(2nd surface) P=−1.3156, (3rd surface) P=−1.3156
(5th surface) P=−1.3156, (6th surface) P=−1.3156

| Fourth Embodiment | | |
|---|---|---|
| $f = \infty$, NA = −0.1144 | | |
| $r_1 = \infty$ | (image position) | |
| $d_1 = 18.3529$ | | |
| $r_2 = 22.9481$ | (aspherical surface) | |
| $d_2 = 18.2943$ | $n_1 = 1.52566$ | $v_1 = 56.28$ |
| $r_3 = -22.9481$ | (aspherical surface) | |
| $d_3 = 18.3529$ | | |
| $r_4 = \infty$ | (pupil) | |
| $d_4 = 18.3529$ | | |
| $r_5 = 22.9481$ | (aspherical surface) | |
| $d_5 = 18.2943$ | $n_2 = 1.52566$ | $v_2 = 56.28$ |
| $r_6 = -22.9481$ | (aspherical surface) | |
| $d_6 = 18.3529$ | | |

-continued

Fourth Embodiment

| | |
|---|---|
| $r_7 = \infty$ | (image position) | aspherical surface coefficient
(2nd surface) P=−1.3189, (3rd surface) P=−1.3189
(5th surface) P=−1.3189, (6th surface) P=−1.3189

Fifth Embodiment f = 484.433, NA = −0.1281
| | | |
|---|---|---|
| $r_1 = \infty$ | (image position) | |
| $d_1 = 33.5246$ | $n_1 = 1.52566$ | $v_1 = 56.28$ |
| $r_2 = -11.5508$ | (aspherical surface) | |
| $d_2 = 21.4755$ | | |
| $r_3 = \infty$ | (pupil) | |
| $d_3 = 21.4755$ | | |
| $r_4 = 11.5508$ | (aspherical surface) | |
| $d_4 = 33.5246$ | $n_2 = 1.52566$ | $v_2 = 56.28$ |
| $r_5 = \infty$ | (image position) | | aspherical surface coefficient
(2nd surface) P=−0.0627, (3rd surface) P=−0.0627

Sixth embodiment f = −934.172, NA = −0.1307
| | | |
|---|---|---|
| $r_1 = \infty$ | (image position) | |
| $d_1 = 21.6253$ | | |
| $r_2 = 11.3675$ | (aspherical surface) | |
| $d_2 = 33.3747$ | $n_1 = 1.52566$ | $v_1 = 56.28$ |
| $r_3 = \infty$ | (pupil) | |
| $d_3 = 33.3747$ | $n_2 = 1.52566$ | $v_2 = 56.28$ |
| $r_4 = -11.3675$ | (aspherical surface) | |
| $d_4 = 21.6253$ | | |
| $r_5 = \infty$ | (image position) | | aspherical surface coefficient
(2nd surface) P=−0.0607, (3rd surface) P=−0.0607 wherein the reference symbols $r_1$, $r_2$, . . . represent radii of curvature on surfaces of respective lens elements, the reference symbols $d_1$, $d_2$, . . . designate airspaces reserved between surfaces of the respective lens elements, the reference symbols $n_1$, $n_2$, . . . denote refractive indices of the respective lens elements, and the reference symbols $v_1$, $v_2$, . . . represent Abbe's numbers of the respective lens elements.

Figure 3:
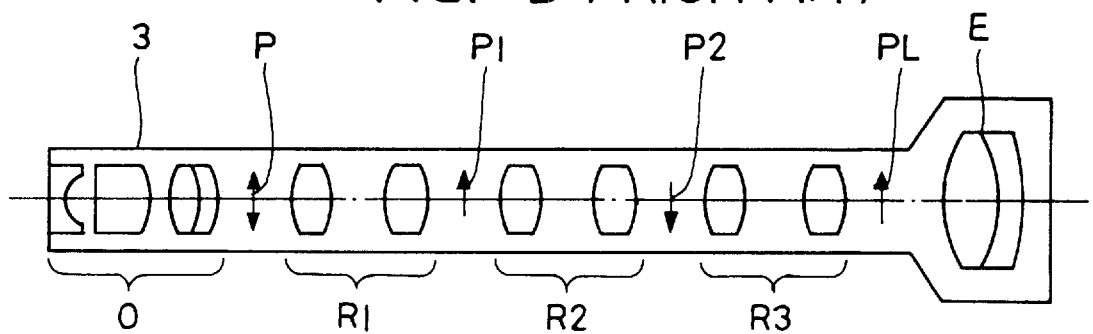
FIG. 3 shows a sectional view illustrating a composition of another conventional non-flexible endoscope.
Figure 4:
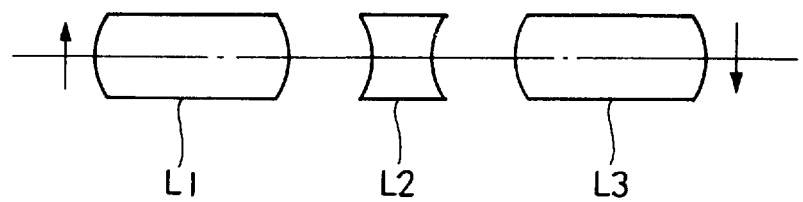
FIG. 4 shows a sectional view illustrating a composition of a conventional relay lens system.
Figure 5:
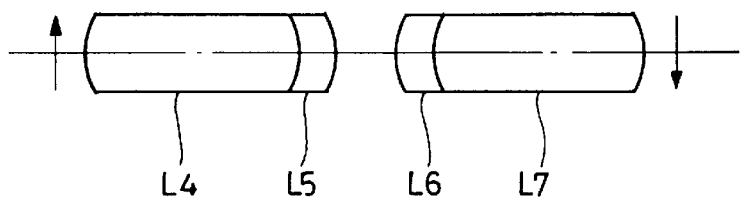
FIG. 5 shows a sectional view illustrating a composition of another conventional relay lens system.

The third embodiment of the present invention is a relay optical system having a composition illustrated in FIG. 3, wherein three biconvex bar-shaped lens elements are disposed with airspaces D reserved therebetween for composing a relay lens system for a single relay cycle. This relay lens system functions to transmit an image formed at location P to another location P'. The reference symbol Q designates a location of a pupil. The relay lens system preferred as the third embodiment consists of three lens components: a section from the location P (surface $r_1$ in the numerical data) to a right side surface of a first lens component $L_1$, a second lens component $L_2$ in which a pupil Q is located, and another section from P' (surface $r_7$ in the numerical data) to a left side surface of a third lens component $L_3$. When a relay optical system is to perform a large number of relay cycles, it can be composed of a small number of lens elements since the lens system for a single relay cycle can be composed of substantially two lens elements. Further, the relay optical system can easily be assembled and manufactured at a low cost. Furthermore, the biconvex bar-shaped lens element has two end surfaces which are configured as aspherical surfaces having the same shape and curvature lowered from the optical axis toward the marginal portions thereof. Spherical aberration is corrected favorably by these aspherical surfaces.

In addition, the aspherical surfaces used in the third embodiment are located so as to reserve a required amount of marginal rays and not to form images of dust.

It is desirable for reserving the required amount of the marginal to locate the aspherical surfaces of the lens components as close as possible to the location of an image or a pupil. When the aspherical surfaces are too close to the location of an image, however, images of dust adhering to the lens surfaces will undesirably be formed on an image surface. Considering this fact, it is desirable that the relay lens system satisfies the following condition (2):

$$0.1 < D_1/t < 0.3 \tag{2}$$

wherein the reference symbol $D_1$ represents a distance as measured from the image surface to an aspherical surface whichever is closest to the image surface and the reference symbol t designates a length of the relay lens system for a single relay cycle.

Since the relay lens system preferred as the third embodiment permits varying a ratio between sizes of the images of dust particles and a diameter of a light bundle passing therethrough dependently on positional relationship between the location of the image surface and the aspherical lens surfaces, it is necessary to locate the aspherical surfaces apart from the image surface so as to thicken the diameter of the light bundle on the lens surfaces and prevent the images of dust particles from being formed on the image surface, whereby it is desirable that distances as measured from the image surface to the lens surfaces are longer than 10% of a distance as measured from the image surface to the location of the pupil.

If the lower limit of the condition (2) is exceeded, or if $D_1/t$ is smaller than 0.1, the lens surfaces will be too close to the image surface thereby undesirably allowing the images of dust particles to be formed on the image surface. If $D_1/t$ is larger than 0.3, in contrast, the lens surfaces will be too far from the image surface, thereby undesirably resulting in insufficiency of the marginal rays.

The relay lens system preferred as the fourth embodiment of the present invention has a composition illustrated in FIG. 14 wherein two bar-shaped lens elements are disposed with an airspace D' reserved therebetween. For relaying an image for one cycle from a location P to another location P', this relay lens system used a first biconvex bar-shaped lens element $L_1$ disposed between the image location P and a pupil location Q, and a second biconvex bar-shaped lens component $L_2$ disposed between the pupil location Q and the other image location P'.

For preventing images of dust particles adhering to lens surfaces from being formed, the fourth embodiment selects distances between an image surface thereof and aspherical surfaces of the lens components so as to satisfy the following condition (3):

$$D_2/t < 0.7 \tag{3}$$

wherein the reference symbol $D_2$ represents thickness of the biconvex bar-shaped lens element as measured on the optical axis.

The condition ((3) defines a ratio of the thickness of the lens element relative to a length of the relay lens system which serves for a single relay cycle and is required for enlarging diameters of a light bundle on the surfaces of the lens elements so as to prevent the images of dust particles from being formed on the image surface of the lens system. In case of the relay lens system of the type-selected for the fourth embodiment, sizes of dust particles will undesirably be too large for diameters of the light bundle unless the thickness of the lens element is smaller than 70% of the length of the relay lens system serving for a single relay cycle. If $D_2/t$ is larger than 0.7, the lens surfaces will be too close to the image surface, thereby undesirably allowing the images of dust particles to be formed on the image surface of the relay lens system.

The fifth embodiment of the present invention has the composition illustrated in FIG. 15, wherein an image P is located in one of the biconvex bar-shaped lens element (a first lens element $L_1$) and a transmitted image P' is located in the other biconvex bar-shaped lens element (a second lens element $L_2$). Accordingly, the length of this relay lens system serving for a single relay cycle can be regarded as being composed of two lens elements: one composed of a section from an image location ($r_1$) in the lens element shown on the left side in FIG. 15 to a right side surface of this lens element, and the other composed of another section from the left side surface ($r_4$) of lens element shown on the right side in FIG. 15 to another image location ($r_5$) in this lens element. However, the length of the relay lens system serving for a single relay cycle is composed substantially of a single lens element.

The sixth embodiment of the present invention has the composition illustrated in FIG. 16, wherein a pupil is located in a biconvex bar-shaped lens element and a length of the relay lens system serving for a single relay cycle is composed of only one bar-shaped lens element.

Each of the fifth and sixth embodiments has an extremely simple composition wherein the length of the relay lens system serving for a single relay cycle is composed substantially of a single lens element. Accordingly, these embodiments are effective for composing relay optical systems which require small number of parts and can be easily assembled even when the relay optical systems are to be used for relaying images pluralities of cycles in non-flexible endoscopes.

The non-flexible endoscope according to the present invention has a configuration in which an insertion section is separated from an eyepiece section, and is configured so as to correct longitudinal chromatic aberration produced by an observation optical system with an optical system disposed in an eyepiece section, thereby being highly effective for simplifying a composition and reducing a manufacturing cost of the insertion section so as to make it disposable. Further, the relay optical system according to the present invention consists of three or a smaller number of lens components, each composed of a single lens element, can be manufactured at a low cost and corrects spherical aberration favorably by using aspherical surfaces.

We claim:

1. A non-flexible endoscope comprising:
   an insertion section which comprises an observation optical system for forming an image of an object to be observed and is to be inserted into a cavity to be observed; and
   an eyepiece section which comprises an eyepiece optical system configured so as to be attachable and detachable to and from said insertion section,
   wherein said observation optical system produces longitudinal chromatic aberration and said eyepiece optical system corrects said chromatic aberration,
   said observation optical system comprises an objective optical system and a relay optical system, and
   said eyepiece optical system comprises at least one cemented lens component and satisfies the condition defined below:

$N_{oc} \geq N_R + 1$ wherein the reference symbol $N_{oc}$ represents a number of cemented lens components comprised in said eyepiece optical system and the reference symbol $N_R$ designates a number of relay cycle, to be performed by said relay optical system.

2. A non-flexible endoscope according to claim 1, wherein said observation optical system comprises a plurality of lens components each of which is composed of a single lens element.

3. A non-flexible endoscope according to claim 2 wherein all lens elements are made of a plastic material.

4. A non-flexible endoscope according to claim 1, wherein said eyepiece optical system comprises an optical system which forms an intermediate image of the object to be observed in said eyepiece section.

5. A non-flexible endoscope according to claim 1, wherein said relay optical system is composed of lens components each of which consists of a single lens element.

6. A non-flexible endoscope comprising:
   an insertion section which comprises an observation optical system for forming an image of an object to be observed and is to be inserted into a cavity to be observed, and
   an eyepiece section which comprises an eyepiece optical system configured so as to be attachable and detachable to and from said insertion section,
   wherein said observation optical system produces longitudinal chromatic aberration and said eyepiece optical system corrects said chromatic aberration,
   said insertion section is attachable and detachable to and from said eyepiece section,
   said eyepiece optical system comprises an optical system which forms an intermediate image of said object to be observed in said eyepiece section and at least one cemented lens component, and
   said observation optical system comprises an objective optical system and a relay optical system, and satisfies the condition defined below:

$N_{oc} \geq N_R + 1$ wherein the reference symbol $N_{oc}$ represents a number of cemented lens components comprised in said eyepiece optical system and the reference symbol $N_R$ designates a number of relay cycles to be performed by said relay optical system.

7. A non-flexible endoscope according to claim 6 wherein each of lens components used for composing said objective optical system and said relay optical system is composed of a single lens element.

8. A non-flexible endoscope comprising:
   an insertion section which comprises an observation optical system for forming an image of an object to be observed and is to be inserted into a cavity to be observed, and
   an eyepiece section which comprises an eyepiece optical system configured so as to be attachable and detachable to and from said insertion section,
   wherein said observation optical system produces longitudinal chromatic aberration and said eyepiece optical system corrects said chromatic aberration;

said relay optical system is composed of lens components each of which consists of a single lens element, said observation optical system comprises an objective optical system and a relay optical system, said relay optical system is composed of unit relay optical systems, each comprising a lens element in the middle of which an image of an object is formed, a lens element in the middle of which a pupil is formed and a lens element in the middle of which an image of the object is formed, and said lens elements are disposed at equal intervals.

9. A non-flexible endoscope comprising:

an insertion section which comprises an observation optical system for forming an image of an object to be observed and is to be inserted into a cavity to be observed; and an eyepiece section which comprises an eyepiece optical system configured so as to be attachable and detachable to and from said insertion section, wherein said observation optical system produces longitudinal chromatic aberration and said eyepiece optical system corrects said chromatic aberration, said observation optical system comprises an objective optical system and a relay optical system, said relay optical system comprises a relay unit which is composed of no more than three singe lens elements each having a positive refractive power, wherein at least one surface of said single lens elements is configured as an aspherical surface, and said relay unit comprises in order from the object side, a lens element in the middle of which an image of an object is formed, a lens element in the middle of which a pupil is formed and a lens element in the middle of which an image of an object is formed, each of said lens elements being a positive single lens and being disposed at equal intervals.

10. A non-flexible endoscope comprising:

an insertion section which comprises an observation optical system for forming an image of an object to be observed and is to be inserted into a cavity to be observed; and an eyepiece section which comprises an eyepiece optical system configured so as to be attachable and detachable to and from said insertion section, wherein said observation optical system produces longitudinal chromatic aberration and said eyepiece optical system corrects said chromatic aberration, said observation optical system comprises an objective optical system and a relay optical system, said relay optical system comprises a relay unit which is composed of no more than three single lens elements each having a positive refractive power, at least one surface of said single lens elements is configured as an aspherical surface, said relay unit is composed of two lens elements and configured so as to reimage an image of an object formed on a side of incidence of one lens element onto a side of emergence of the other lens element, said optical system has a pupil between said two lens elements, and each of said lens elements is a single lens and is disposed between said pupil and said images.

11. A non-flexible endoscope comprising:

an insertion section which comprises an observation optical system for forming an image of an object to be observed and is to be inserted into a cavity to be observed; and an eyepiece section which comprises an eyepiece optical system configured so as to be attachable and detachable to and from said insertion section, wherein said observation optical system Produces longitudinal chromatic aberration and said eyepiece optical system corrects said chromatic aberration, said observation optical system comprises an objective optical system and a relay optical system, said relay optical system comprises a relay unit which is composed of no more than three single lens elements each having a positive refractive power;

at least one surface of said single lens elements is configured as an aspherical surface, said relay unit is composed of two lens elements and configured so as to reimage an image formed in the middle of one of said lens elements onto the middle of the other lens element, a pupil is located in the middle of a space between said two lens elements, and each of said lens elements is a positive single lens and is disposed at equal intervals.

12. A non-flexible endoscope comprising:

an insertion section which comprises an observation optical system for forming an image of an object to be observed and is to be inserted into a cavity to be observed; and an eyepiece section which comprises, an eyepiece optical system configured so as to be attachable and detachable to and from said insertion section, wherein said observation optical system produces longitudinal chromatic aberration and said eyepiece optical system corrects ;aid chromatic aberration, said observation optical system comprises an objective optical system and a relay optical system, said relay optical system comprises a relay unit which is composed of no more than three of single lens elements each having a positive refractive power, at least one surface of said singe lens elements is configured as an aspherical surface; and said relay unit is composed of only a single bi-convex lens and configured such that an image of said object, said single bi-convex lens and a reimage of the object to be observed are positioned in that order from an object side, and a pupil is located in a middle of said single bi-convex lens.

* * * * *